(12) United States Patent
Dropps et al.

(10) Patent No.: US 7,406,092 B2
(45) Date of Patent: Jul. 29, 2008

(54) PROGRAMMABLE PSEUDO VIRTUAL LANES FOR FIBRE CHANNEL SYSTEMS

(75) Inventors: Frank R. Dropps, Maple Grove, MN (US); Edward C. Ross, Edina, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 751 days.

(21) Appl. No.: 10/894,597

(22) Filed: Jul. 20, 2004

(65) Prior Publication Data

US 2005/0018676 A1    Jan. 27, 2005

Related U.S. Application Data

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/572,197, filed on May 18, 2004, provisional application No. 60/532,963, filed on Dec. 29, 2003.

(51) Int. Cl.
*H04J 3/16* (2006.01)

(52) U.S. Cl. ....................................................... 370/437
(58) Field of Classification Search ................. 370/241, 370/242, 252, 389, 400, 412, 429, 437, 465, 370/477, 503; 709/228, 237, 238
See application file for complete search history.

(56) References Cited

U.S. PATENT DOCUMENTS 4,081,612 A    3/1978    Hafner (Continued)

FOREIGN PATENT DOCUMENTS

| EP | 0649098 | 9/1994 |
| EP | 0856969 | 1/1998 |
| WO | WO-98/36537 | 8/1998 |
| WO | WO03/088050 | 10/2003 |

OTHER PUBLICATIONS

International Preliminary Report on Patentability dated Apr. 3, 2007, for International patent application No. PCT/US2005/034844.

(Continued)

*Primary Examiner*—Dmitry Levitan
(74) *Attorney, Agent, or Firm*—Klein, O'Neill & Singh, LLP

(57) ABSTRACT

A method and switch element for assigning priority to pseudo virtual lanes ("PVL") using a fibre channel switch element is provided. The method includes, assigning received R_RDYs based on a PVL distribution scheme; and determining traffic congestion on a PVL if there is no credit available to transfer frames from the PVL. A minimum bandwidth feature is enabled to avoid lower priority PVLs from getting no credit for transmitting frames; and distributing credit and R_RDYs based on frame age bits, wherein a lower priority PVL gets credit if a frame is waiting in the PVL for a longer duration compared to a higher priority PVL. The switch element includes, a PVL module having credit counters for plural PVLs; and a timer that monitors frame traffic for each PVL lane. If a PVL gets congested, then a state machine adjusts priority of R_RDY distribution scheme of other PVLs to transmit frames.

8 Claims, 19 Drawing Sheets

U.S. PATENT DOCUMENTS

| | | | |
|---|---|---|---|
| 4,162,375 A | 7/1979 | Schlichte | 179/15 |
| 4,200,929 A | 4/1980 | Davidjuk et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,725,835 A | 2/1988 | Schreiner et al. | 340/825.83 |
| 4,821,034 A | 4/1989 | Anderson et al. | 340/825 |
| 4,980,857 A | 12/1990 | Walter et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,260,933 A | 11/1993 | Rouse | |
| 5,339,311 A | 8/1994 | Turner | |
| 5,367,520 A | 11/1994 | Cordell | 370/60 |
| 5,390,173 A | 2/1995 | Spinney et al. | |
| 5,568,165 A | 10/1996 | Kimura | |
| 5,590,125 A | 12/1996 | Acampora et al. | |
| 5,598,541 A | 1/1997 | Malladi | 395/286 |
| 5,610,745 A | 3/1997 | Bennett | 359/139 |
| 5,666,483 A | 9/1997 | McClary | |
| 5,687,172 A | 11/1997 | Cloonan et al. | 370/395 |
| 5,748,612 A | 5/1998 | Stoevhase et al. | 370/230 |
| 5,790,840 A | 8/1998 | Bulka et al. | |
| 5,818,842 A | 10/1998 | Burwell et al. | 370/397 |
| 5,821,875 A | 10/1998 | Lee et al. | |
| 5,825,748 A | 10/1998 | Barkey et al. | |
| 5,828,475 A | 10/1998 | Bennett et al. | |
| 5,835,752 A | 11/1998 | Chiang et al. | |
| 5,850,386 A | 12/1998 | Anderson et al. | |
| 5,894,560 A | 4/1999 | Carmichael et al. | |
| 5,954,796 A | 9/1999 | McCarty et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,014,383 A | 1/2000 | McCarty | 370/453 |
| 6,021,128 A | 2/2000 | Hosoya et al. | 370/380 |
| 6,031,842 A | 2/2000 | Trevitt et al. | |
| 6,047,323 A | 4/2000 | Krause | 709/227 |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,128,292 A | 10/2000 | Kim et al. | 370/356 |
| 6,144,668 A | 11/2000 | Bass et al. | |
| 6,160,813 A | 12/2000 | Banks et al. | 370/422 |
| 6,201,787 B1 | 3/2001 | Baldwin et al. | |
| 6,229,822 B1 | 5/2001 | Chow et al. | |
| 6,240,096 B1 | 5/2001 | Book | |
| 6,252,891 B1 | 6/2001 | Perches | |
| 6,253,267 B1 | 6/2001 | Kim et al. | |
| 6,289,002 B1 | 9/2001 | Henson et al. | |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,343,324 B1 | 1/2002 | Hubis et al. | |
| 6,353,612 B1 | 3/2002 | Zhu et al. | |
| 6,370,605 B1 | 4/2002 | Chong | |
| 6,401,128 B1 | 6/2002 | Stai et al. | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,711 B1 | 7/2002 | Blumenau et al. | |
| 6,424,658 B1 | 7/2002 | Mathur | 370/429 |
| 6,449,274 B1 | 9/2002 | Holden et al. | 370/392 |
| 6,452,915 B1 | 9/2002 | Jorgensen | |
| 6,457,090 B1 | 9/2002 | Young | |
| 6,467,008 B1 | 10/2002 | Gentry et al. | 710/261 |
| 6,470,026 B1 | 10/2002 | Pearson et al. | |
| 6,532,212 B1 | 3/2003 | Soloway et al. | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,614,796 B1 | 9/2003 | Black et al. | |
| 6,657,962 B1 | 12/2003 | Barri et al. | |
| 6,697,359 B1 | 2/2004 | George | 370/357 |
| 6,697,368 B2 | 2/2004 | Chang et al. | |
| 6,718,497 B1 | 4/2004 | Whitby-Strevens | |
| 6,738,381 B1 | 5/2004 | Agnevik et al. | |
| 6,744,772 B1 | 6/2004 | Eneboe et al. | |
| 6,760,302 B1 | 7/2004 | Ellinas et al. | |
| 6,785,241 B1 | 8/2004 | Lu et al. | |
| 6,807,181 B1 | 10/2004 | Weschler | |
| 6,816,492 B1 | 11/2004 | Turner et al. | |
| 6,816,750 B1 | 11/2004 | Klaas | |
| 6,859,435 B1 | 2/2005 | Lee et al. | |
| 6,865,157 B1 | 3/2005 | Scott et al. | |
| 6,886,141 B1 | 4/2005 | Kunz et al. | |
| 6,941,357 B2 | 9/2005 | Nguyen et al. | |
| 6,941,482 B2 | 9/2005 | Strong | |
| 6,952,659 B2 | 10/2005 | King et al. | |
| 6,968,463 B2 | 11/2005 | Pherson et al. | |
| 7,000,025 B1 | 2/2006 | Wilson | |
| 7,002,926 B1 | 2/2006 | Eneboe et al. | |
| 7,010,607 B1 * | 3/2006 | Bunton | 709/228 |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,055,068 B2 | 5/2006 | Riedl | |
| 7,061,862 B2 | 6/2006 | Horiguchi et al. | |
| 7,061,871 B2 | 6/2006 | Sheldon et al. | |
| 7,092,374 B1 | 8/2006 | Gubbi | |
| 7,110,394 B1 | 9/2006 | Chamdani et al. | |
| 7,123,306 B1 | 10/2006 | Goto et al. | |
| 7,124,169 B2 | 10/2006 | Shimozono et al. | |
| 7,151,778 B2 | 12/2006 | Zhu et al. | |
| 7,171,050 B2 | 1/2007 | Kim | |
| 7,185,062 B2 | 2/2007 | Lolayekar et al. | |
| 7,188,364 B2 | 3/2007 | Volpano | |
| 7,190,667 B2 | 3/2007 | Susnow et al. | |
| 7,194,538 B1 | 3/2007 | Rabe et al. | |
| 7,200,108 B2 | 4/2007 | Beer et al. | |
| 7,215,680 B2 * | 5/2007 | Mullendore et al. | 370/412 |
| 7,221,650 B1 | 5/2007 | Cooper et al. | |
| 7,245,613 B1 | 7/2007 | Winkles et al. | |
| 7,248,580 B2 | 7/2007 | George et al. | |
| 7,269,131 B2 | 11/2007 | Cashman et al. | |
| 7,292,593 B1 | 11/2007 | Winkles et al. | |
| 7,327,680 B1 | 2/2008 | Kloth | |
| 2001/0011357 A1 | 8/2001 | Mori | |
| 2001/0022823 A1 | 9/2001 | Renaud | |
| 2001/0038628 A1 | 11/2001 | Ofek et al. | 370/392 |
| 2001/0047460 A1 | 11/2001 | Kobayashi et al. | |
| 2002/0016838 A1 | 2/2002 | Geluc et al. | |
| 2002/0034178 A1 | 3/2002 | Schmidt et al. | |
| 2002/0071387 A1 | 6/2002 | Horiguchi et al. | |
| 2002/0103913 A1 | 8/2002 | Tawil et al. | |
| 2002/0104039 A1 | 8/2002 | DeRolf et al. | |
| 2002/0124124 A1 | 9/2002 | Matsumoto et al. | |
| 2002/0147560 A1 | 10/2002 | Devins et al. | |
| 2002/0147843 A1 | 10/2002 | Rao | |
| 2002/0156918 A1 | 10/2002 | Valdevit et al. | |
| 2002/0159385 A1 | 10/2002 | Susnow et al. | |
| 2002/0172195 A1 | 11/2002 | Pekkala et al. | |
| 2002/0191602 A1 | 12/2002 | Woodring et al. | |
| 2002/0196773 A1 | 12/2002 | Berman | |
| 2003/0002503 A1 | 1/2003 | Brewer et al. | |
| 2003/0016683 A1 | 1/2003 | George et al. | |
| 2003/0021239 A1 | 1/2003 | Mullendore et al. | |

| | | |
|---|---|---|
| 2003/0026267 A1 | 2/2003 | Oberman et al. |
| 2003/0026287 A1 | 2/2003 | Mullendore et al. |
| 2003/0035433 A1* | 2/2003 | Craddock et al. ........... 370/429 |
| 2003/0046396 A1 | 3/2003 | Richter et al. |
| 2003/0056000 A1 | 3/2003 | Mullendore et al. |
| 2003/0072316 A1 | 4/2003 | Niu et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0103451 A1 | 6/2003 | Lutgen et al. |
| 2003/0117961 A1 | 6/2003 | Chuah et al. |
| 2003/0120983 A1 | 6/2003 | Vieregge et al. |
| 2003/0126223 A1 | 7/2003 | Jenne et al. |
| 2003/0137941 A1 | 7/2003 | Kaushik et al. |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ................ 370/389 |
| 2003/0189930 A1* | 10/2003 | Terrell et al. ................. 370/389 |
| 2003/0189935 A1 | 10/2003 | Warden et al. |
| 2003/0191857 A1 | 10/2003 | Terell et al. |
| 2003/0195983 A1* | 10/2003 | Krause ....................... 709/238 |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013092 A1 | 1/2004 | Betker et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0057389 A1 | 3/2004 | Klotz et al. |
| 2004/0081186 A1 | 4/2004 | Warren et al. |
| 2004/0081394 A1 | 4/2004 | Biren et al. |
| 2004/0085955 A1 | 5/2004 | Walter et al. |
| 2004/0085994 A1 | 5/2004 | Warren et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ....................... 370/463 |
| 2004/0151188 A1 | 8/2004 | Maveli et al. |
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0036763 A1 | 2/2005 | Kato et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0184711 A1 | 8/2006 | Pettey |
| 2006/0203725 A1 | 9/2006 | Paul et al. |
| 2007/0206502 A1 | 9/2007 | Martin et al. |

OTHER PUBLICATIONS

International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
Banks, David C., et al., "Link Trucking and Measuring Link Latency in Fibre Channel Fabric", U.S. Appl. No. 60/286,046, 1-52.
Brown, Douglas W., "A State-Machine Synthesizer", *18th Design Automation Conference*, (1981),301-305.
Curtis, A. R., "Design Considerations for 10-Gbit Fibre Channel", Curtis A. Ridgeway, *Distinguished I/O Architect, Storage and Computing ASIC's Division, LSI Logic Corp*.
Malavalli, Kumar , "High Speed Fibre Channel Switching Fabric Devices", *Proceedings of the SPIE, SPIE*, Bellingham, VA, USA vol. 1577., XP000562869, ISSN: 0277-786X,(Sep. 4, 1991),216-226.
Melhem, et al., "Minimizing Wavelength Conversions in WDM Path Establishment", *Computer Science Department, University of Pittsburgh*, Pittsburgh, PA 15260, (2001),197-211.
Ridgeway, Curt , "0GFC-40GFC using 4-lane XAUI's", *LSI Logic Presentation—T11/03-069v0*.
Clark, Tom, "Zoning for Fibre Channel Fabrics", Vixel Corporation Paper—XP002185194., (Aug. 1999), pp. 1-6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE, (Sep. 8, 1992), pp. 65-71.
Yoshida, Hu, "LUN Security Considerations for Storage Area Networks," Hitachi Data Systems Paper—XP 002185193 (1999), pp. 1-7.
Claudio DeSanti, "Virtual Fabrics Switch Support"; VF Switch Support, T11/04-395v2. Sep. 2004, pp. 1-15.
Pelissier et al, "Inter-Fabric Routing", dated Jul. 30, 2004, Inter Fabric Routing (04-520v0); pp. 1-31.
DeSanti et al, "Virtual Fabrics"; Virtual Fabrics, T11/03-352v0, May 2003; pp. 1-4.
Martin et al , "Virtual Channel Architecture", Presentation by Brocade to T11/03-369V0 dated Jun. 2, 2003.
"Office Action from USPTO dated Mar. 5, 2008 for U.S. Appl. No. 10/889,259".
"Office Action from USPTO dated Mar. 7, 2008 for U.S. Appl. No. 10/894,629".
"Office Action from USPTO dated Mar. 20, 2008 for U.S. Appl. No. 10/894,732".
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
"Office Action from USPTO dated Dec. 7, 2007 for U.S. Appl. No. 10/961,463".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Notice of Allowance from USPTO dated Jan. 8, 2008 for U.S. Appl. No. 10/889,551".
"Office Action from USPTO dated Jan. 9, 2008 for U.S. Appl. No. 10/798,468".

"Office Action from USPTO dated Jan. 9, 2008 for U.S. Appl. No. 11/608,634".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

"Examination Report from the European Patent Office dated Oct. 12, 2007 for European Application No. 05 906 632.6".

Malavalli, et al., "Fibre Channel Framing and Signaling (FC-FS) REV 1.10", *NCITS working draft proposed American National Standard for Information Technology*, (Jan. 25, 2001).

"Office Action from USPTO dated May 21, 2007 for U.S. Appl. No. 10/212,425".

"Office Action from USPTO dated Oct. 18, 2006 for U.S. Appl. No. 10/241,153".

"Office Action from USPTO dated Apr. 3, 2007 for U.S. Appl. No. 10/241,153".

"Office Action from USPTO dated Nov. 16, 2007 for U.S. Appl. No. 10/241,153".

"Office Action from USPTO dated Nov. 15, 2006 for U.S. Appl. No. 10/263,858".

"Office Action from USPTO dated Jul. 11, 2007 for U.S. Appl. No. 10/263,858".

"Office Action from USPTO dated Jan. 19, 2007 for U.S. Appl. No. 10/302,149".

"Office Action from USPTO dated Aug. 20, 2007 for U.S. Appl. No. 10/302,149".

"Office Action from USPTO dated Jul. 3, 2007 for U.S. Appl. No. 10/664,548".

"Office Action from USPTO dated Sep. 20, 2007 for U.S. Appl. No. 10/798,527".

"Office Action from USPTO dated Sep. 20, 2007 for U.S. Appl. No. 10/889,267".

"Office Action from USPTO dated Aug. 31, 2007 for U.S. Appl. No. 10/889,635".

"Office Action from USPTO dated Mar. 21, 2006 for U.S. Appl. No. 10/889,588".

"Office Action from USPTO dated Sep. 10, 2007 for U.S. Appl. No. 10/889,255".

"Office Action from USPTO dated Sep. 4, 2007 for U.S. Appl. No. 10/889,551".

"Office Action from USPTO dated Sep. 20, 2007 for U.S. Appl. No. 10/889,259".

"Office Action from USPTO dated Sep. 19, 2007 for U.S. Appl. No. 10/894,492".

"Office Action from USPTO dated Oct. 4, 2007 for U.S. Appl. No. 10/894,627".

"Office Action from USPTO dated Oct. 25, 2007 for U.S. Appl. No. 10/894,491".

"Office Action from USPTO dated Oct. 25, 2007 for U.S. Appl. No. 10/894,579".

"Office Action from USPTO dated Oct. 11, 2007 for U.S. Appl. No. 10/894,629".

"Office Action from USPTO dated Oct. 25, 2007 for U.S. Appl. No. 10/894,536".

"Office Action from USPTO dated Nov. 13, 2007 for U.S. Appl. No. 10/894,586".

"Office Action from USPTO dated Oct. 17, 2007 for U.S. Appl. No. 10/894,917".

Naik, D. "Inside Windows Storage:Server Storage Technologies for Windows 2000, Windows Server 2003 and Beyond", *Addison-Wesley, US, Chapter 5, XP-002381152*, (Jul. 15, 2003),137-173.

"Deliver Server-Free Backup", *Pathlight & Computer Associates*, White Paper of Apr. 2000, Ithaca, New York, XP-002381153,1-8.

* cited by examiner

500 # PROGRAMMABLE PSEUDO VIRTUAL LANES FOR FIBRE CHANNEL SYSTEMS

CROSS REFERENCE TO RELATED APPLICATIONS

This application claims priority under 35 U.S.C.§ 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled" Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network"

Filed on Aug. 14, 2003, Ser. No. 60/495, 165, entitled "LUN Based Hard Zoning in Fibre Channel Switches";

Filed on Sep. 19, 2003, Ser. No. 60/503,809, entitled "Multi Speed Cut Through Operation in Fibre Channel Switches"

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane"

Filed on Dec. 29, 2003, Ser. No. 60/532,966, entitled "Method And System For Using Extended Fabric Features With Fibre Channel Switch Elements"

Filed on Mar. 4, 2004, Ser. No. 60/550,250, entitled "Method And System for Programmable Data Dependent Network Routing"

Filed on May 7, 2004, Ser. No. 60/569,436, entitled "Method And System For Congestion Control In A Fibre Channel Switch"

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to using programmable pseudo virtual lanes in fibre channel switches.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Often a fibre channel switch is coupled between devices that use varying data rates to transfer data. The mis-match in the data transfer rates can result in inefficient use of the overall bandwidth. An illustration of this problem is shown in FIG. 2. FIG. 2 shows switches 207 and 209 coupled by a 10G link 208. Host systems 203 and 202 are coupled to switch 207 by 2G links 204 and 205, respectively. Host system 201 is coupled by a 1G link 206. A target 213 is coupled to switch 209 by a 1G link 210, while targets 214 and 215 are coupled by 2G links 211 and 212, respectively.

As is shown in FIG. 2, host 203 can send data at 2G to target 213 that can receive data at 1G. Since target 213 receives data at a lower rate that can overfill the receive buffers in switch 209 resulting in bandwidth degradation. One way to avoid this problem is to use virtual lanes.

Fibre channel switches use "virtual lanes" to allocate receive credits at an E_port or N_port. Virtual lanes are a portion of the data path between a source and destination port. Credits are allocated into groups so that a fast device sending data to a slow device does not consume all of the receive credits and cause bandwidth degradation.

The fibre channel standard does not provide any guidance as to how virtual lanes should be assigned or programmed.

Conventional switches use a destination identifier ("D_ID" a primitive defined by fibre channel standards) to assign virtual lanes. This by itself is not very efficient or adaptive because fabric topology can vary and D_ID may not be the best parameter for virtual lane assignment.

Therefore, what is required is a process and system that efficiently selects virtual lanes to maximize bandwidth based on fabric topology.

SUMMARY OF THE PRESENT INVENTION

In one aspect of the present invention, a method for assigning priority to pseudo virtual lanes ("PVL") using a fibre channel switch element is provided. The method includes, assigning received R_RDYs based on a PVL distribution scheme; determining traffic congestion on a PVL if there is no credit available to transfer frames from the PVL; and adjusting a PVL counter value. Traffic congestion is determined by monitoring a threshold wait count value for the PVL.

In yet another aspect, a method for routing fibre channel frames using a fibre channel switch element is provided. The method includes, enabling a minimum bandwidth feature to avoid lower priority pseudo virtual lanes from getting no credit for transmitting frames; and distributing credit and R_RDYs based on frame age bits, wherein a lower priority pseudo virtual lane ("PVL") gets credit if a frame is waiting in the PVL for a longer duration compared to a higher priority PVL.

In yet another aspect of the present invention, a fibre channel switch element having a receive segment and a transmit segment for routing fibre channel frames is provided. The switch element includes, a pseudo virtual lane ("PVL") module having credit counters for plural PVLs, wherein each PVL is assigned a threshold credit value and a maximum credit value; and a timer that monitors frame traffic for each PVL and if a PVL stops transmitting frames, a status bit is sent to a state machine that adjusts PVL priority based on the status bit. If a higher priority lane gets congested, then the state machine adjusts priority of R_RDY distribution scheme of other PVLs to transmit frames.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"E-Port": A fabric expansion port that attaches to another Interconnect port to create an Inter-Switch Link.

"F_Port": A port to which non-loop N_Ports are attached to a fabric and does not include FL_ports.

"Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": A system which interconnects various ports attached to it and is capable of routing fibre channel frames by using destination identifiers provided in FC-2 frame headers.

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.--Port or F.Sub.--Port.

"L_Port": A port that contains Arbitrated Loop functions associated with the Arbitrated Loop topology.

"N-Port": A direct fabric attached port.

"NL_Port": A L_Port that can perform the function of a N_Port.

"Switch": A fabric element conforming to the Fibre Channel Switch standards.

"VL": Virtual Lane: A portion of the data path between a source and destination port.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
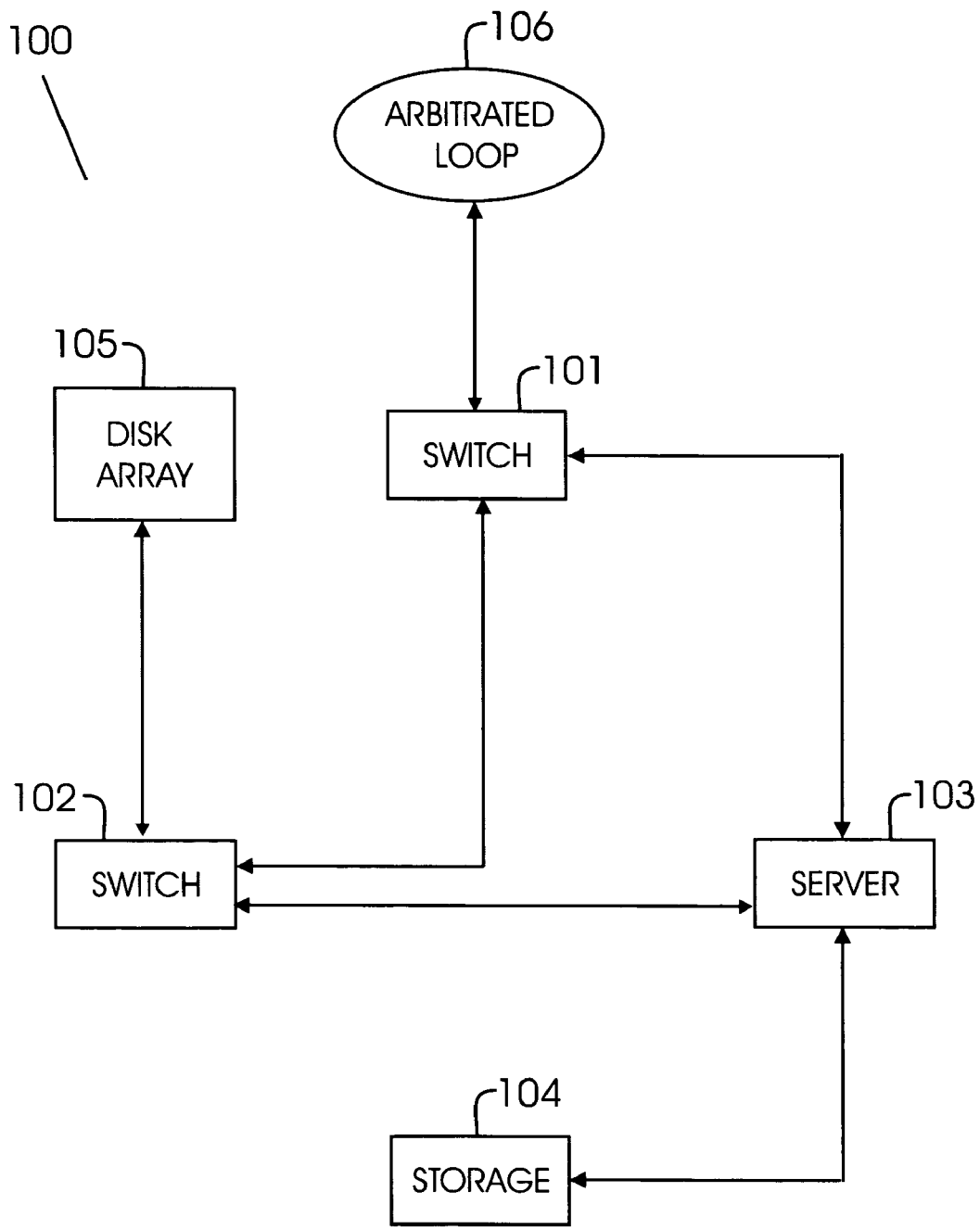
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
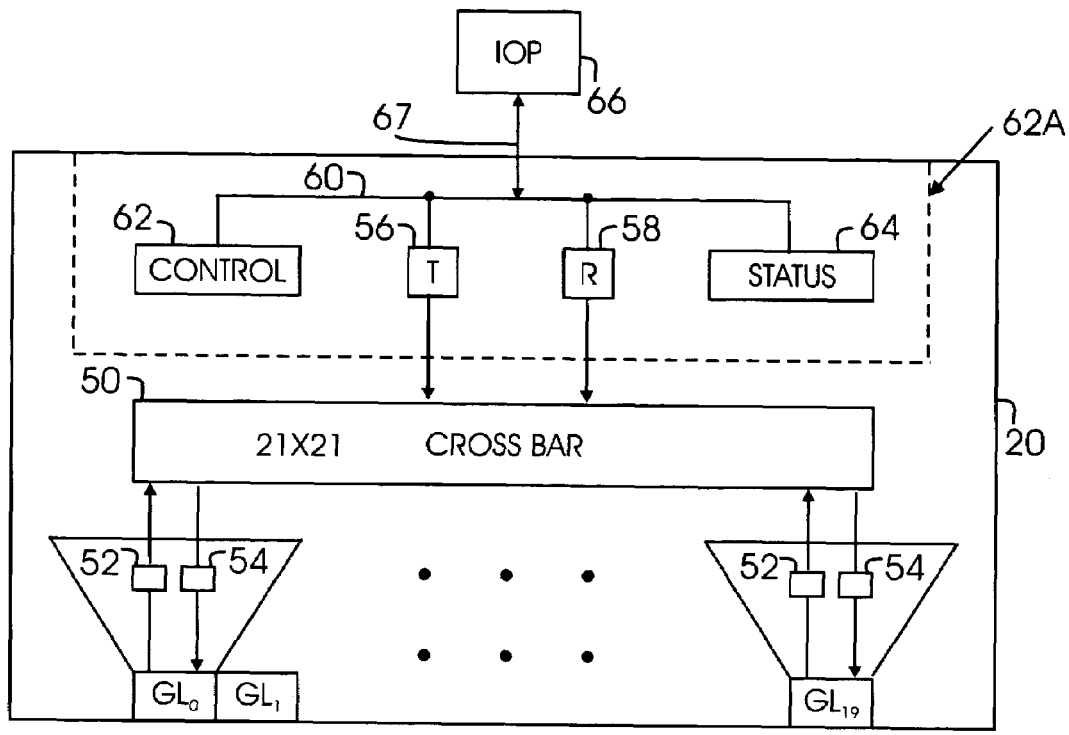
FIG. 1B shows an example of a Fibre Channel switch element, according to one aspect of the present invention.

FIG. 1B is a block diagram of a 20-port ASIC ("Application Specific Integrated Circuit") fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port FL_Port and E-Port. In other words, depending upon what it is attached to, each generic port (also referred to as GL Ports) can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
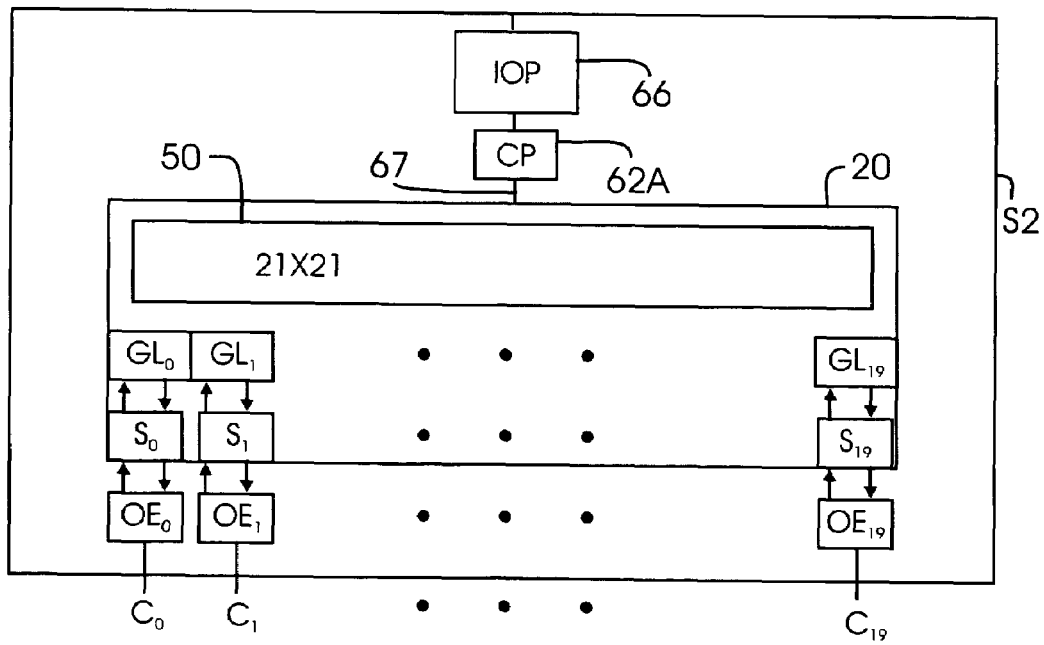
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56 (also referred to as "T"), receive buffer 58 (also referred to as "R"), control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by by monitoring circuits (not shown).

FIG. 1C shows a 20-channel switch chassis S2 using ASIC 20 and IOP 66. S2 will also include other elements, for example, a power supply (not shown). The 20 GL ports correspond to channel (also referred to as "C") C0-C19. Each GL port has a serial/deserializer (SERGES) (also referred to as "S") designated as S0-S19. Ideally, the SERGES functions are implemented on ASIC 20 for efficiency, but may alternatively be external to each GL port.

Each GL port has an optical-electric convener (also referred to as "OE"), designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
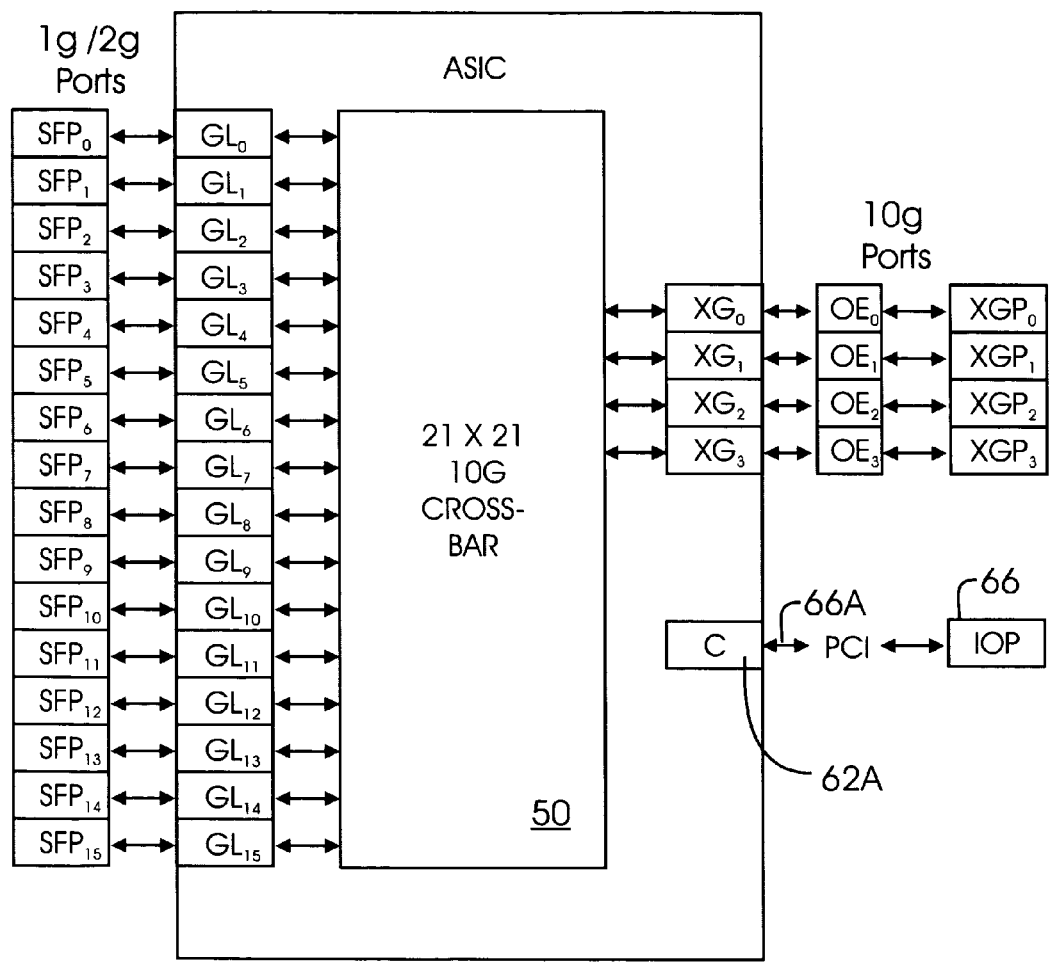
FIG. 1D shows a block diagram of a Fibre Channel switch element with sixteen GL_Ports and four 10G ports, according to one aspect of the present invention.

FIG. 1D shows a block diagram of ASIC 20 with sixteen GL ports and four 10G (Gigabyte) port control modules designated as $XG_0$-$XG_3$ for four 10G ports designated as XGP0-XGP3. GL ports $GL_0$-$GL_{15}$ communicate with 1 g/2 g SFP Port modules $SFP_0$-$SFP_{15}$. SFP is a small form factor pluggable optical transceiver. ASIC 20 include a control port 62A (also referred to as "CP") that is coupled to IOP 66 through a peripheral component interconnect "PCI" connection 66A.

Figures 1, 1E:
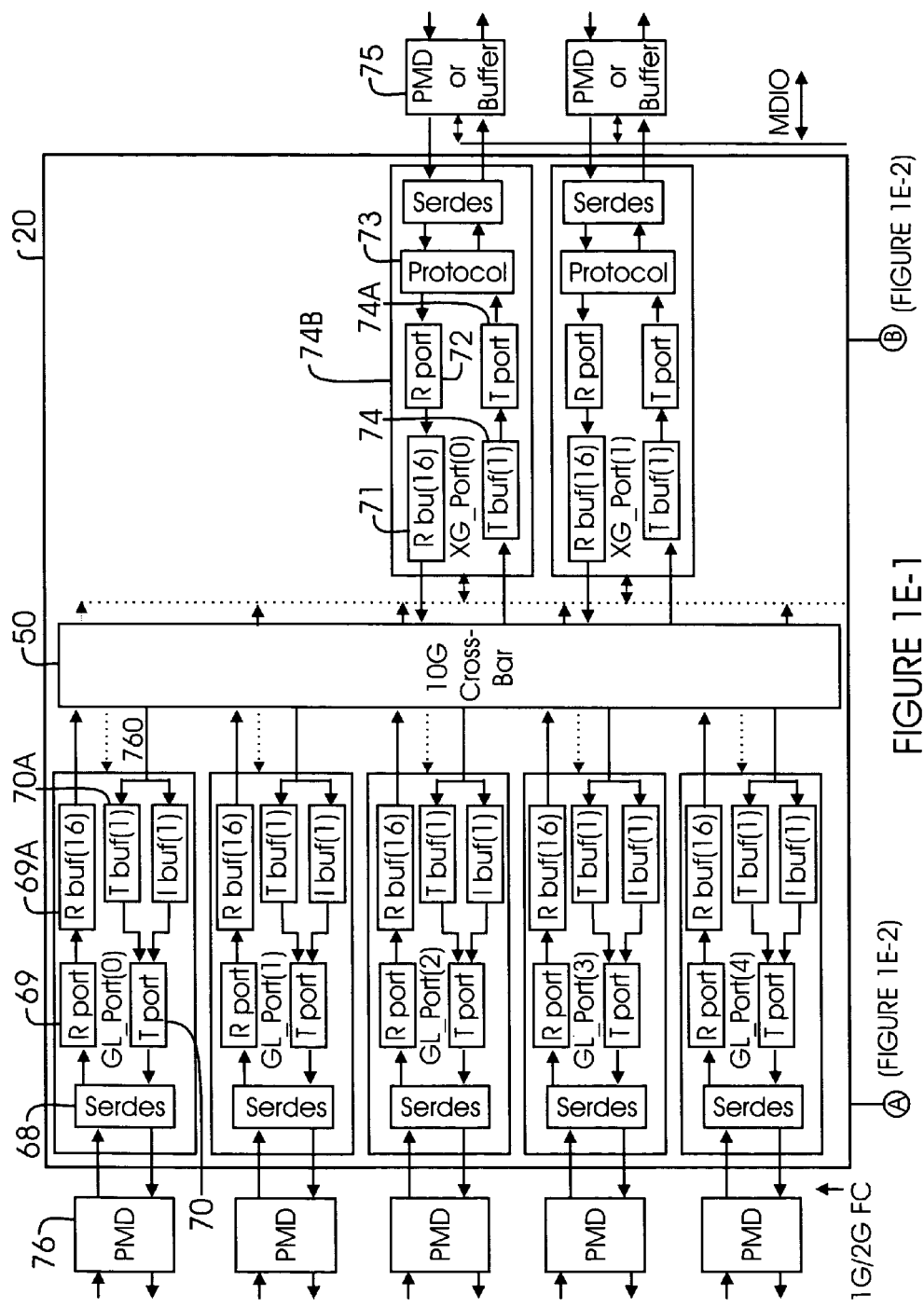
FIGS. 1E-1/1E-2 (jointly referred to as FIG. 1E) show another block diagram of a Fibre Channel switch element with sixteen GL_Ports and four 10G ports, according to one aspect of the present invention.

FIGS. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
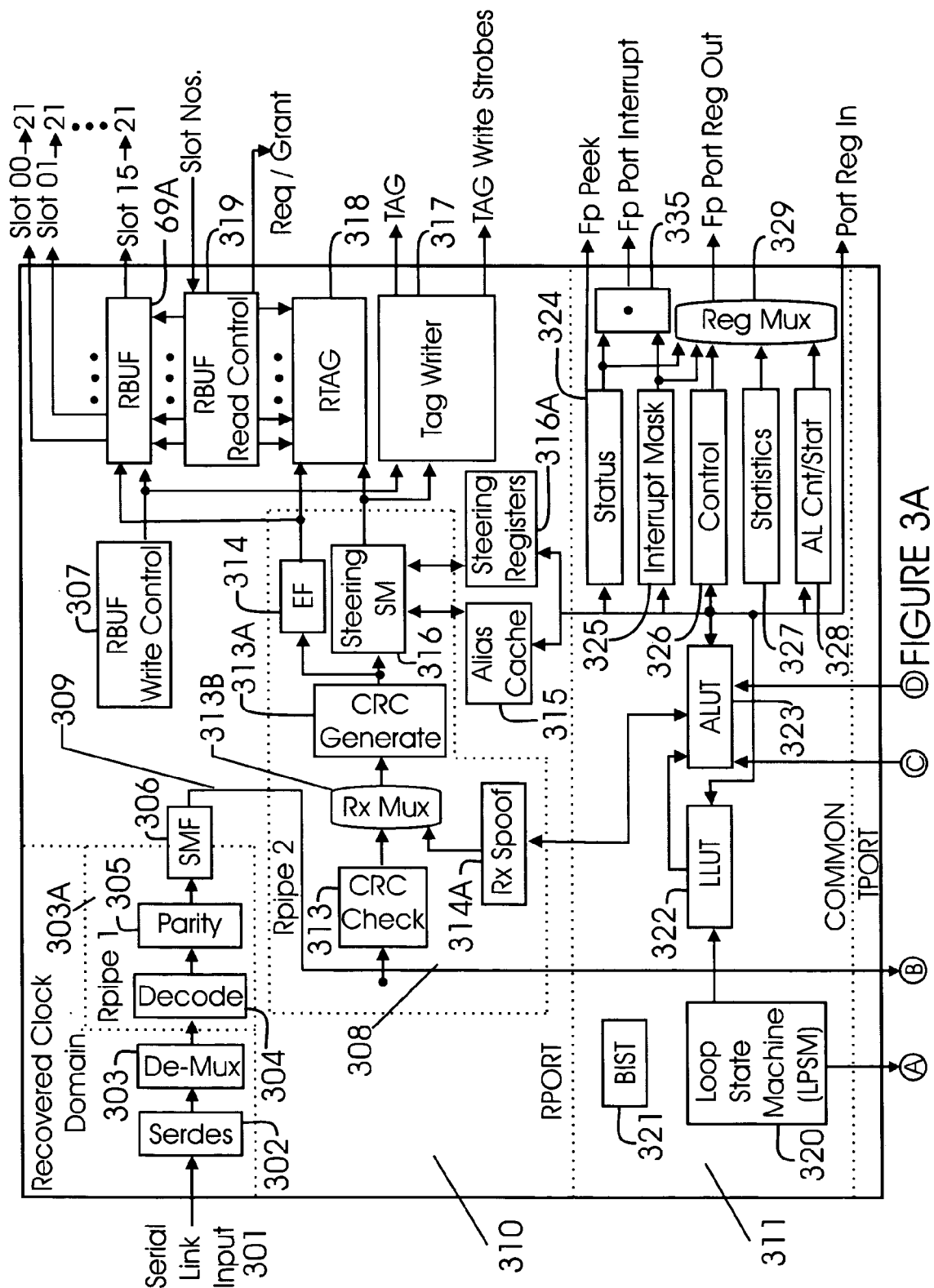
FIGS. 3A/3B (jointly referred to as FIG. 3) show a block diagram of a GL_Port, according to one aspect of the present invention.
Figure 3B:
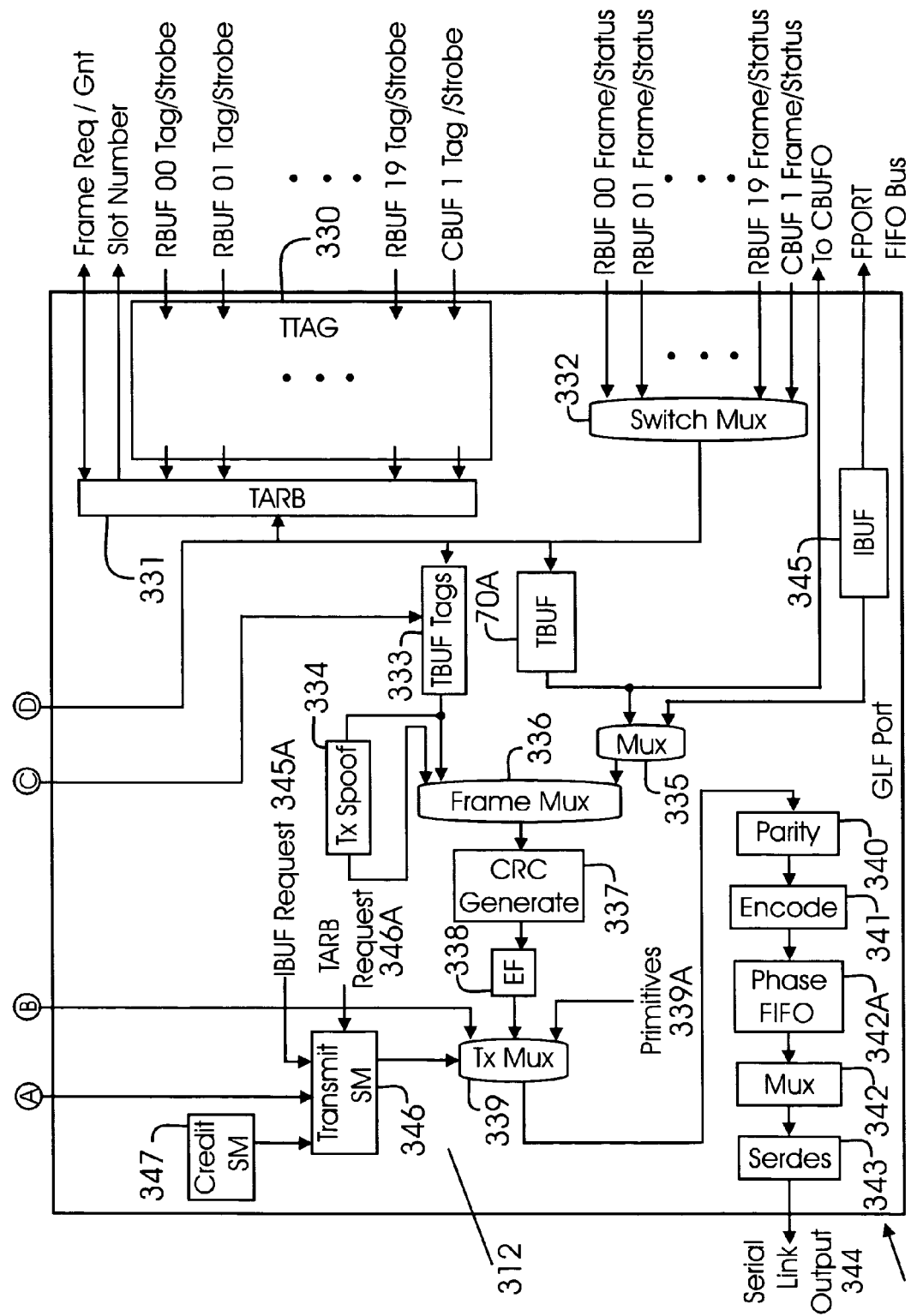

GL Port:

FIGS. 3A-3B (referred to as FIG. 3) show a detailed block diagram of a GL port as used in ASIC 20. GL port 300 (also referred to as GLF Port) is shown in three segments, namely, receive segment (RPORT) 310, transmit segment (TPORT) 312 and common segment 311.

Receive Segment of GL Port:

Frames enter through link 301 and SERDES 302 converts data into 10-bit parallel data to fibre channel characters, which are then sent to receive pipe ("Rpipe" (may also be referred to as "Rpipe1" or "Rpipe2") 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer ("Mux") 313B, CRC generate module 313A and EF (external proprietary format) module 314. EF module 314 encodes proprietary (i.e. non-standard) format frames to standard Fibre Channel 8B codes. Mux 313B receives input from Rx Spoof module 314A, which encodes frames to an proprietary format (if enabled). RWT 307 controls RBUF 69A write address and provide the slot number to tag writer ("TWT") 317.

RRD 319 processes frame transfer requests from RBUF 69A. Frames may be read out in any order and multiple destinations may get copies of the frames.

Steering state machine (SSM or Steering SM) 316 receives frames and determines the destination for forwarding the frame. SSM 316 produces a destination mask, where there is one bit for each destination. Any bit set to a certain value, for example 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses. Alias cache 315 based routing is described below in detail, according to one aspect of the present invention.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX ("TxMUX") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF (external proprietary format) module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Port:

a. As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG Port

Figure 4A:
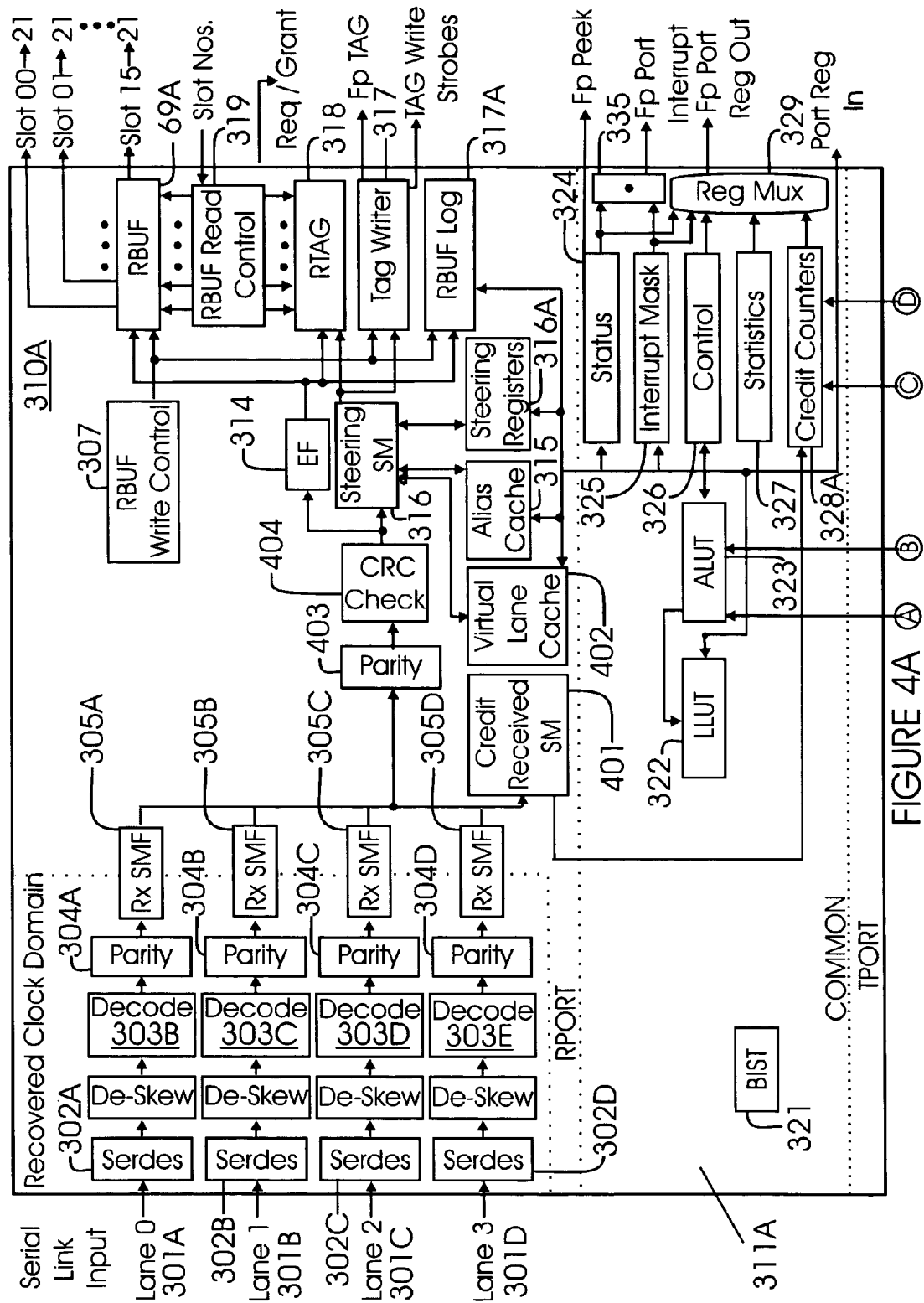
FIGS. 4A/4B (jointly referred to as FIG. 3) show a block diagram of XG_Port (10G) port, according to one aspect of the present invention.
Figure 4B:
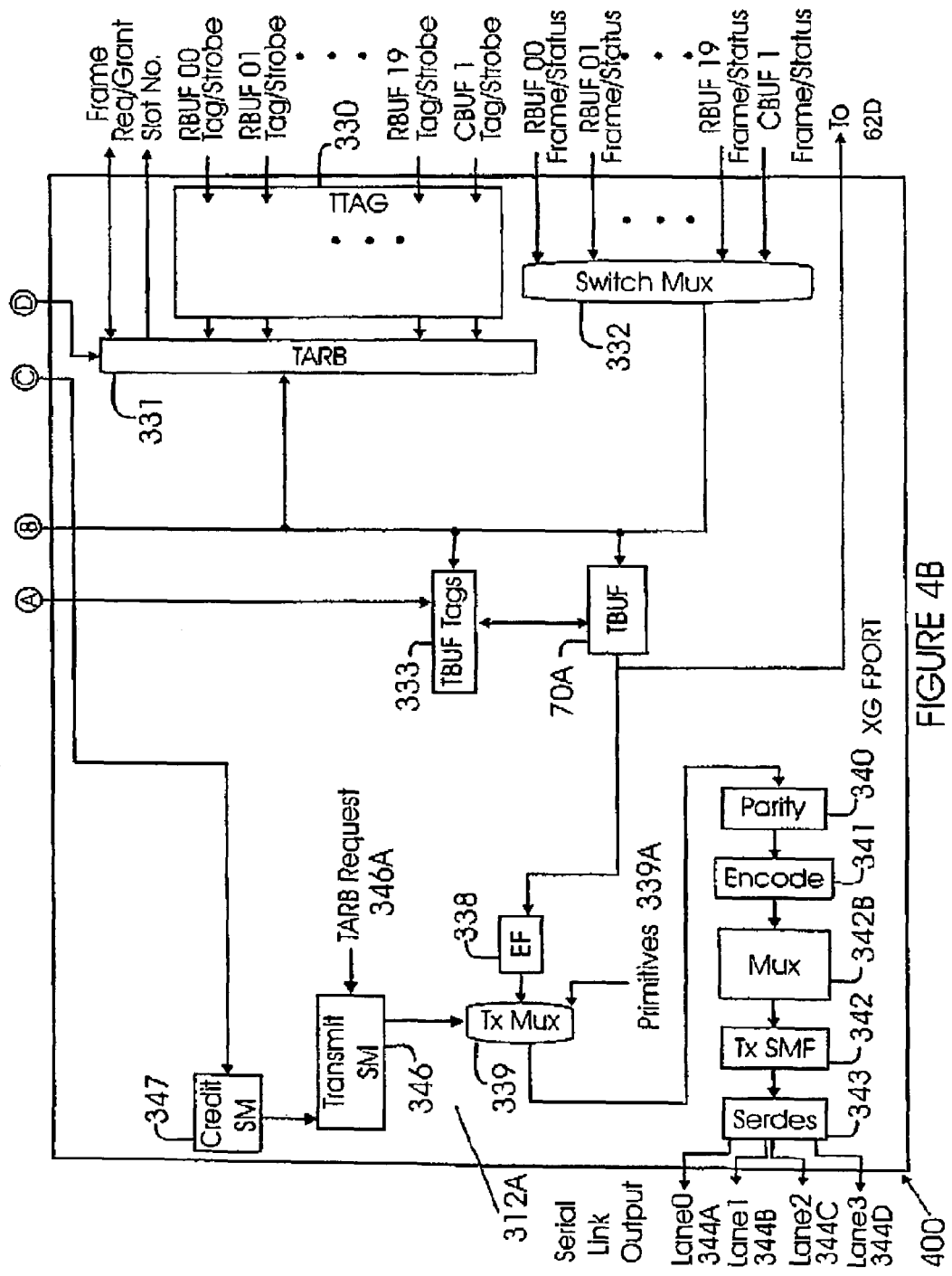

FIGS. 4A-4B (referred to as FIG. 4) show a block diagram of a 10 G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a smoothing (TxSMF) module 342 that handles clock variation on the transmit side. SERDES 343 then sends the data out to the link.

VL Cache 402

Figure 5:
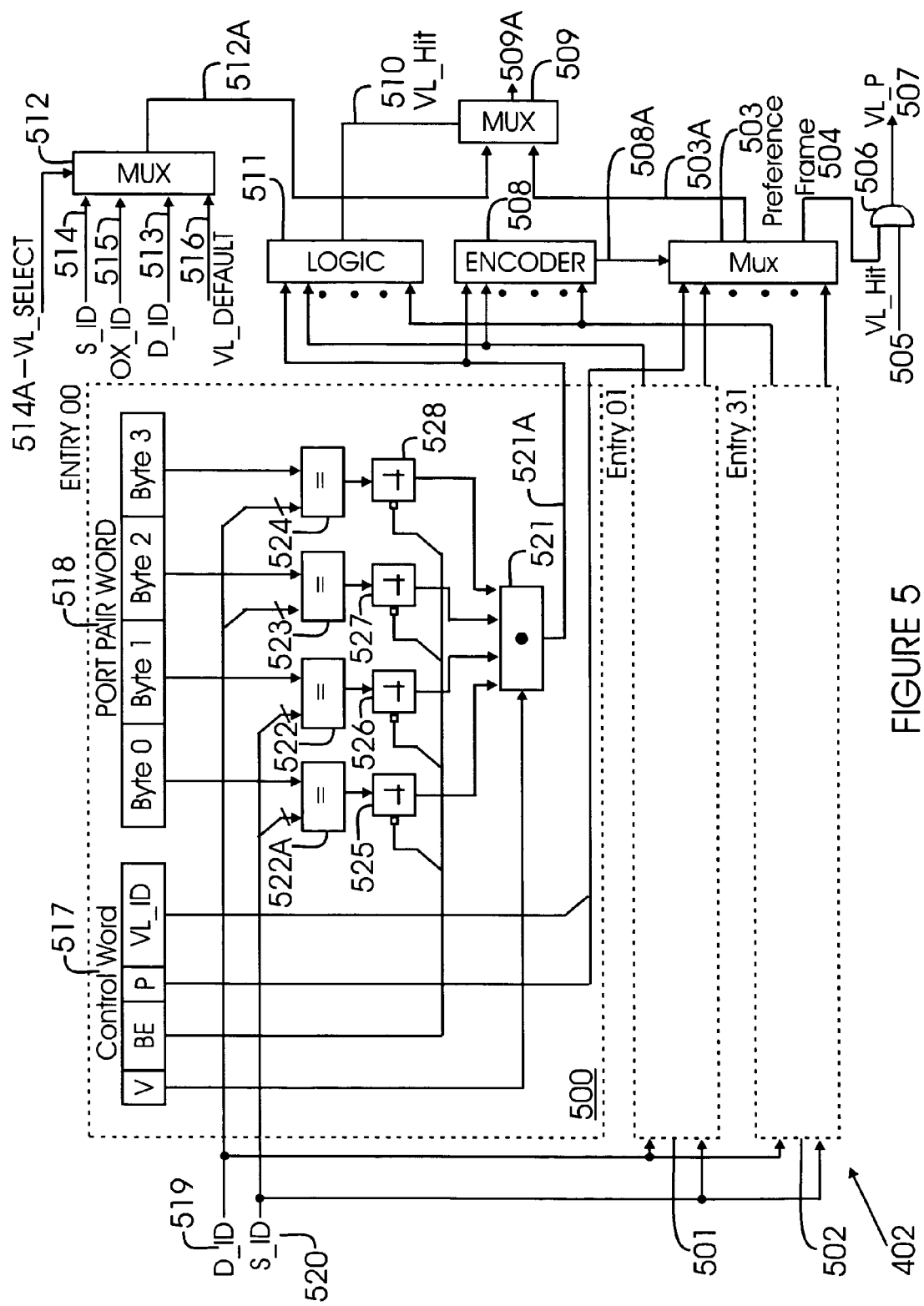
FIG. 5 shows a schematic of a VL cache, used according to one aspect of the present invention.

FIG. 5 shows a detailed block diagram of VL cache 402. Logic 500 is for the first entry (00). Subsequent entries are shown as 501 and 502.

VL_Select bit 514A from control register 326 is used to control the selection of a virtual lane for incoming frames. This allows selection of virtual lanes using various parameters as highlighted by the example below.

If the VL Cache 402 Hit 510=0, then
   000=Use VL_Default value for the VL_ID;
   001=Use D_ID for the VL_ID;
   010=Use OX_ID for the VL_ID
   011=Use S_ID for the VL_ID
   100=Use a virtual storage area network ID (VSAN-ID) number for the VL_ID.
   XXX=Use any other field within the frame If the Virtual Lane Cache 402 Hit=1, then use a bit value supplied by Virtual Lane Cache 402. A virtual Lane identifier can also be selected by identifying the selection within specially coded areas of a frame. For example, when last word byte 3 bit 3=0, then:

VL_Select may be:
   000=VL_Default selects VL_ID
   001=Frame D_ID selects VL_ID
   010=Frame OX_ID selects VL_ID
   011=Frame S_ID selects VL_ID
   100=Use a virtual storage area network ID (VSAN-ID) number for the VL_ID.
   xxx=Any other field within the frame When last word byte 3 bit 3=1, then: Last word byte 3 bits selects VL_ID.

It is noteworthy that the foregoing bit assignment is intended to provide an example of how virtual lanes may be assigned using the adaptive aspects of the present invention. The foregoing bit assignment is not intended to limit the present invention.

VL cache 402 includes a control word register 517, which is an IOP 66 Read Write (r/w) register whose bits determine an associated entry's mode of operation. For example, the "V" bit indicates a valid entry, "BE" indicates "byte enabled" for byte to byte comparison, "P" indicates the preference bit of a frame that allows a frame to jump to the head of the queue of incoming frames for processing, and VL_ID indicates the virtual identification. It is noteworthy the fields in register 517 although shown with certain bit values (for example, the BE bit is 4 bits and VL_ID bit is 3 bits); this is not to limit the invention to any particular bit value and is merely to provide an example. This is also true for other figures illustrating the various aspects of the present invention.

VL cache 402 also includes a port pair register 518 that stores certain bit values for D_ID and S_ID comparison. When D_ID 519 and S_ID 520 of a frame enter VL cache 402, the valid entries are compared to port pair word 518 entries. Logic 522A, 522, 523, 524, 525, 526, 527, 528 and 521 performs the comparison. Logic 521 generates the result of the comparison 521A, which is sent to encoder 508, and logic 511.

Logic 511 provides a VL hit signal (or command) 510 to MUX 509 that indicates that the virtual lane assignment is to be based on VL cache 402 values. Mux 509 generates signal 509A for virtual lane assignment.

Control register 326 includes various select values, for example, VL_Select and a default value. These can be selected by the firmware for virtual lane assignment. These values (for example, S_ID 514 (similar to 520), OX_ID 515, D_ID 513 (similar to 519) and a default virtual lane (VL_DEFAULT) 516) are sent to MUX 512. Based on control register 326 values, frame fields and VL select 514A, Mux 512 generates a bit value 512A that is sent to Mux 509 for assigning VLs.

Mux 503 is used to generate a preference frame tag 504 based on the "P" field in register 517. Signal VL_P 507 designates the preference for a virtual lane frame. Signal 507 is generated using gate 506 and is based on frame data 504 and VL_Hit 505 (similar to signal 510) signal. Mux 503 also sends an output 503A to Mux 509 and receives an input 508A from encoder 508. Firmware can set field P for such preferential virtual lane assignment. It is noteworthy that the preference frame assignment can also be used without VL operation.

The following table shows an example of VL cache 402 entries. VL_ID may be encoded into a bit field:

| Bits | Function |
|---|---|
| | Virtual Lane ID |
| 00 = | Virtual Lane 00 |
| 01 = | Virtual Lane 01 |
| 02 = | Virtual Lane 02 |
| 03 = | Virtual Lane 03 |
| 04 = | Virtual Lane 04 |
| 05 = | Virtual Lane 05 |
| 06 = | Virtual Lane 06 |
| 07 = | Virtual Lane 07 |
| 07-15 | Reserved |
| 16 = | Enable compare VLPP to incoming frame D_ID AL_PA field |
| 17 = | Enable compare VLPP to incoming frame D_ID area field |
| 18 = | Enable compare VLPP to incoming frame D_ID domain field |
| 19 = | Enable compare VLPP to incoming frame S_ID AL_PA field |
| 20 = | Enable compare VLPP to incoming frame S_ID area field |
| 21 = | Enable compare VLPP to incoming frame S_ID domain field |
| Where 0 = | Force compare equal |
| 1 = | Enable compare for equal or not equal |
| 23 | Preference Frame |
| Where 0 = | Normal frame |
| 1 = | Preference frame Valid |
| 0 = | Not valid |
| 1 = | Valid |

Virtual lane port pairs ("VLPP") provide 32-port pair addresses for the compare mask.

The foregoing (including bit values/"32 Port") is intended to illustrate the various aspects of the present invention and not to limit the invention.

Figure 6:
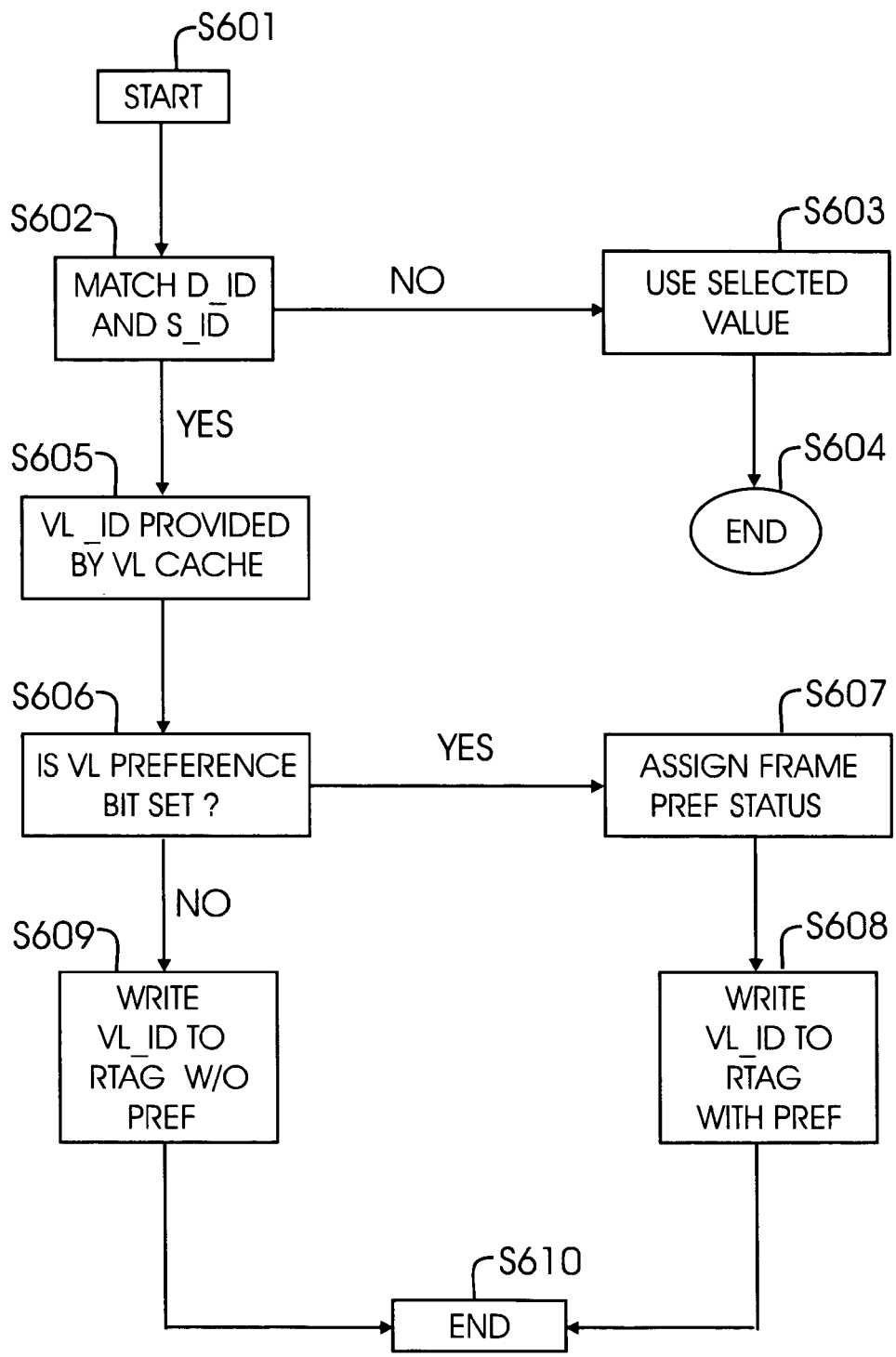
FIG. 6 shows a flow diagram of executable process steps used for selecting virtual lanes, according to one aspect of the present invention.

Process Flow Diagram for Selecting Virtual lanes:

FIG. 6 shows a flow diagram of executable process steps used for selecting virtual lanes, according to one aspect of the present invention.

Turning in detail to FIG. 6, the virtual lane assignment process starts in step S601, when incoming frames are received by RPORT 310A.

In step S602, the process matches the incoming frame's D_ID (519) and S_ID (520) in VL cache 402. If there is no match, then in step S603, a selected value is used to identify the frame's virtual lane. In one aspect, the frame's D_ID, S_ID, OX_ID, the frames virtual storage area number (VSAN ID) number or a VL default value from control register 326 may be used to assign a virtual lane for an incoming frame. Thereafter, the process ends in step S604.

If a valid match occurs in step S602, then in step S605, the VL_ID is provided by VL cache 402.

If VL_ID is to be assigned by VL Cache 402 values, then in step S606, the process determines if a particular frame is to be given preference over other frames. This is based on the value of "P" bit set in control word register 517. If VL preference bit is set, then in step S607, the process generates VL_P 507 that designates a particular frame to be a Virtual lane Preference frame.

In step S608, a VL_ID with preference is written to RTAG 318.

If the VL preference bit is not set, as determined in step S606, then in step S609, a VL_ID without preference is written to RTAG 318 and the process ends in step S610.

In yet another aspect of the present invention, virtual lanes may be assigned based on fabric topology. This is important because bandwidth of various links may vary and may depend on fabric topology.

Figure 7:
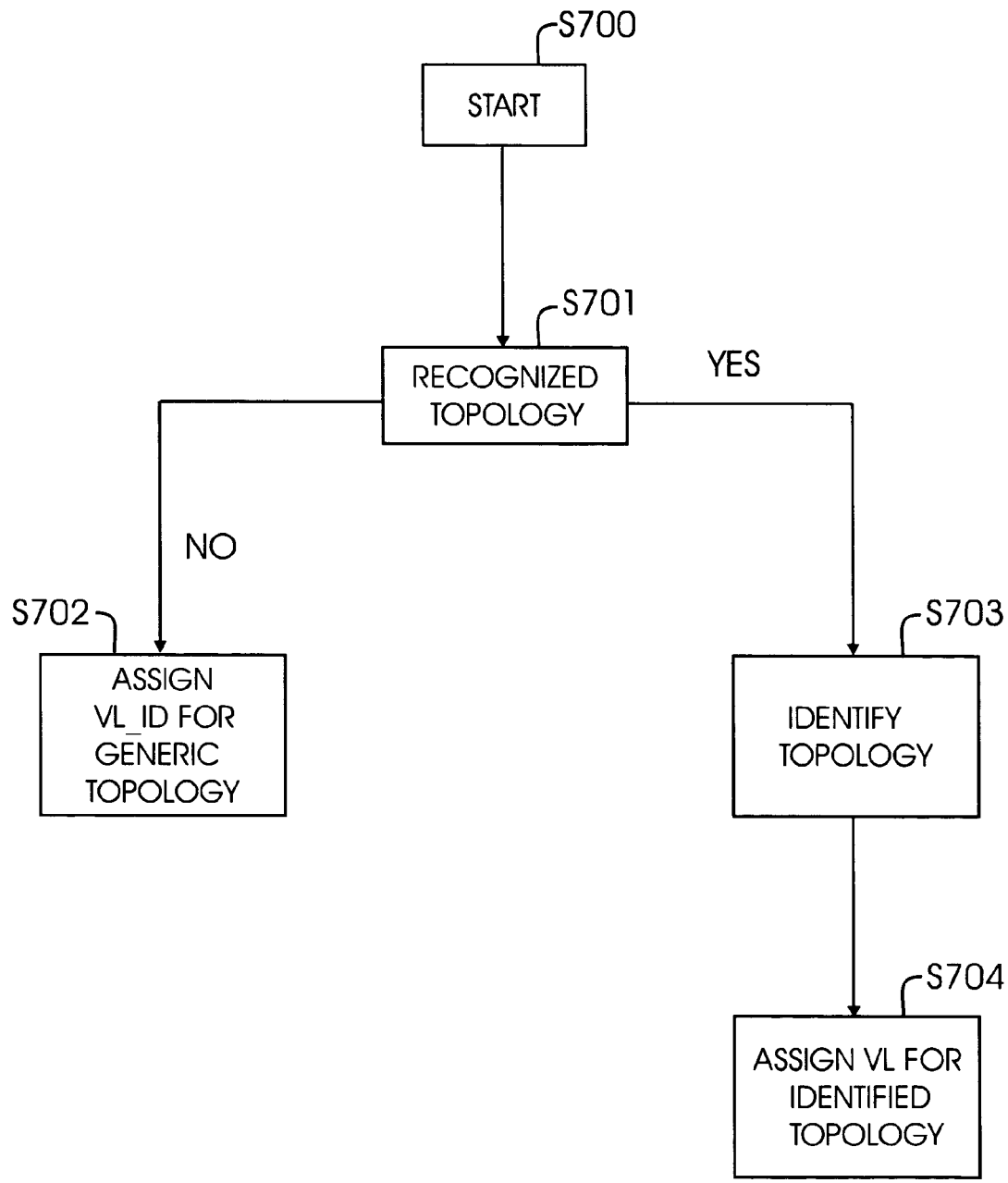
FIG. 7 shows a flow diagram for assigning virtual lanes based on fabric topology, according to one aspect of the present invention.

Assigning Virtual Lanes Based on Fabric Topology:

FIG. 7 shows a flow diagram for assigning virtual lanes based on fabric topology. In one aspect of the present invention, optimum virtual lane assignment based on fabric topology information may be known and stored in firmware.

Turning in detail to FIG. 7, in step S700, the process starts. In step S701, the process determines if a particular fabric topology is known. If the fabric topology is not known, then in step S702, the process makes the optimum generic virtual lane assignments for the fabric topology.

If the fabric topology is known, then in step S703, the fabric topology is identified.

In step S704, the process assigns virtual lanes based on the fabric topology. In one aspect, register 326 or VL cache 402 values may be used by firmware to assign virtual lanes based on the identified topology.

In one aspect of the present invention, virtual lanes may be compressed, which will allow a link that supports N virtual lanes to communicate with another link that may support more than M virtual lanes. In this case, N is not equal to M and in one aspect of the present invention, N may be equal to 4 lanes. A VL_Compress bit may also be stored in register 326 that controls VL compression. VL _Compress is used by TPORT 312A to determine which VC_RDY (a fibre channel standard defined primitive) to send, once notified by RBUF 69A that a frame has been disposed.

Figure 8:
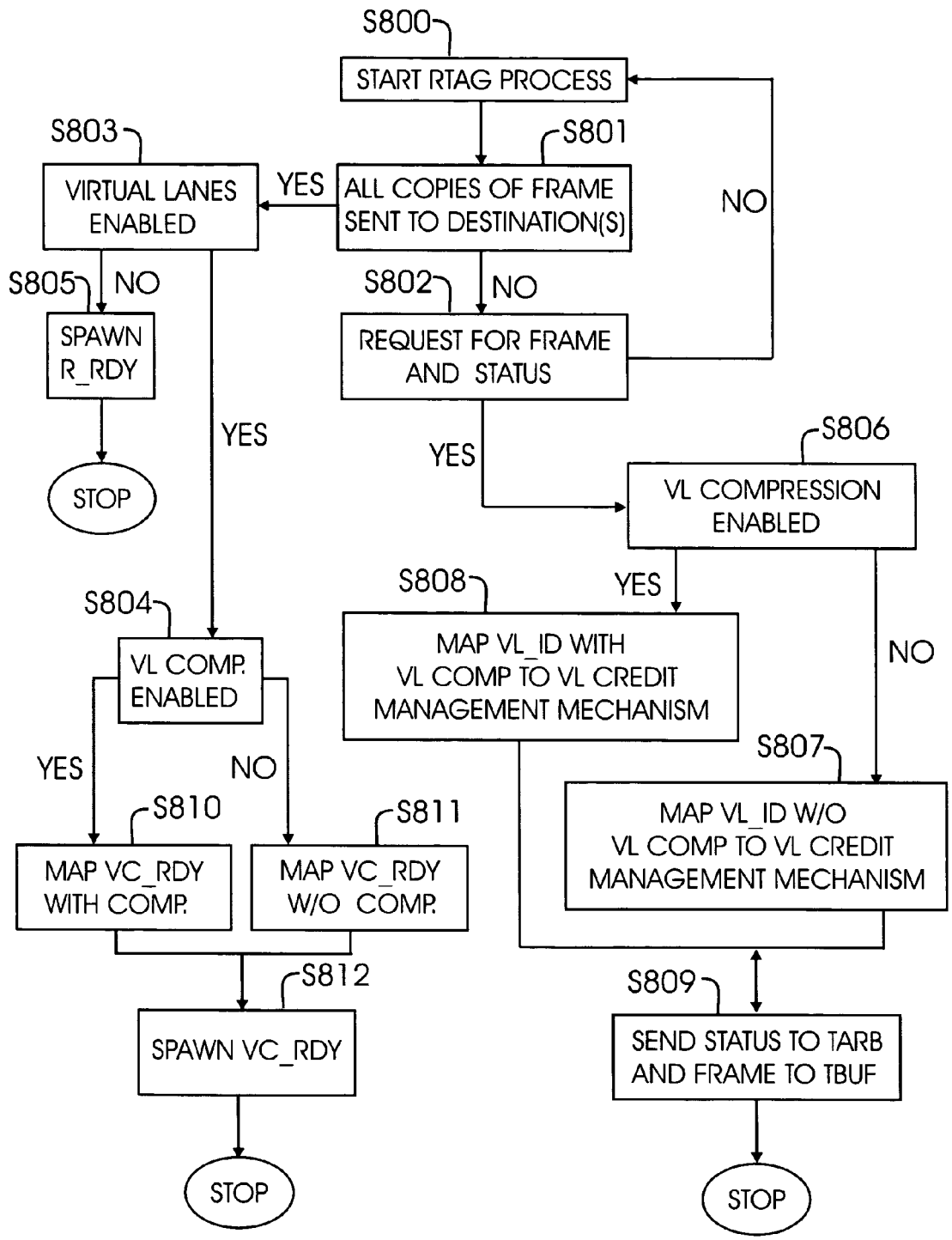
FIG. 8 shows a flow diagram for assigning virtual lanes based on fabric topology, according to one aspect of the present invention.

Adjusting Virtual Lane Credit:

FIG. 8 is a process flow diagram for generating VC_RDYs and adjusting virtual lane credit. The process starts in step S800 (from step S610 in FIG. 6)

In step S801, the process determines if a frame has been sent to all destinations. If the frame has been sent to all destinations, then in step S803, the process determines if virtual lanes are enabled. If virtual lines are not enabled, then in step S805, R_RDYs are spawned and the process ends.

If virtual lanes are enabled then in step S804, the process determines if VL compression is enabled. If VL compression is enabled, then VL_ID(M) is mapped to VC_RDY(M) in step S810 and VC_RDY is spawned in step S812.

If VL compression is not enabled in step S804, then VL_ID (M) is mapped to VC_RDY(M) in step S811, without compression and VC_RDY(M) is spawned in step S812, and the process sends.

If in step S801, the frame has not been sent to all destinations, then in step S802, the process determines if there is a request for the frame and status. If there is no request in step S802, then the process goes back to step S801.

If there is a request for frame and status in step S802, the process determines in step S806 if VL compression is enabled. If VL compression is enabled, then in step S808, VL-ID (M) is mapped to adjust virtual lane credit management mechanism(N). If VL compression is not enabled, then in step S807, VL_ID (M) is mapped to adjust virtual lane credit management mechanism(M).

Thereafter, in step S809, status is sent to TARB 335 and the frame is sent to TBUF 70A An example for Step S811: VL_Compress=0, which means VL compression is not enabled:

| VL # from RBUF | VC RDY |
| --- | --- |
| 0 | 0 |
| 1 | 1 |
| 2 | 2 |
| 3 | 3 |
| 4 | 4 |
| 5 | 5 |
| 6 | 6 |
| 7 | 7 |

An example for step S810: If VL_Compress=1, which means VL compression is enabled, then:

| VL # from RBUF | VC RDY |
| --- | --- |
| 0 | 0 |
| 1 | 1 |
| 2 | 2 |
| 3 | 3 |
| 4 | 0 |
| 5 | 1 |
| 6 | 2 |
| 7 | 3 |

The foregoing is an example to illustrate virtual lane assignment where lanes are compressed and non-compressed situations. The invention is not limited to the foregoing specific allocation of lanes or number of lanes.

In one aspect of the present invention, virtual lane assignment can be programmed based on firmware or fabric topology, making the system and process versatile and flexible.

In yet another aspect of the present invention, virtual lane statistics are collected for each lane. Various counters can be used in statistics module 327 to gather information. For example, a counter ("CL2 Frames In Count" ("C2FI")) increments every time a SOFi2 or SOFn2 frame is received into the fabric. A rollover event is spawned when the counter increments after reaching its maximum value.

Another counter (CL2 Frames Out Count ("C2FO")) increments every time a SOFi2 or SOFn2 frame leaves the fabric. A rollover event is spawned when the counter increments after reaching its maximum value.

Another counter (CL2 Words In Count ("C2WI")) can be used to count every time a frame word of an SOFi2 or SOFn2 frame is received into the fabric. A rollover event is spawned when the counter increments after reaching its maximum value.

Another counter (CL2 Words out Count ("C2WO")) increments every time a SOFi2 or SOFn2 frame word is transmitted from the fabric. A rollover event is spawned when the counter increments after reaching its maximum value.

Another counter (CL3 Frames In Count ("C3FI")) increments every time a SOFi3 or SOFn3 frame is received into the fabric. A rollover event is spawned when the counter increments after reaching its maximum value.

Another counter (CL3 Frames Out Count ("C3FO")) increments every time a SOFi3 or SOFn3 frame is transmitted from the fabric. A rollover event is spawned when the counter increments after reaching its maximum value.

Another counter (CL3 Words In Count ("C3WI")) increments every time a frame word of an SOFi3 or SOFn3 frame is received into the fabric. A rollover event is spawned when the counter increments after reaching its maximum value.

Another counter (CL3 Word Out Count ("C3WO")) increments every time a SOFi3 or SOFn3 frame word is transmitted from the fabric. A rollover event is spawned when the counter increments after reaching its maximum value.

Another counter (ISL Frames In Count ("IFI")) increments when a SOFi2, SOFn2, SOFi3 or SOFn3 frame is received into the fabric that uses steering register 316A domain routing. A rollover event is spawned when the counter increments after reaching its maximum value.

Yet another counter (Invalid Transmission Word Count ("DEC"))increments every time an "Invalid Transmission Word (ITW)" is detected at RPORT 310A. This error can occur on a word basis. A rollover event is spawned when the counter increments after reaching its maximum value.

Another counter (CRC Error Count ("CEC")) increments every time a CRC error is detected on an incoming frame. A rollover event is spawned when the counter increments after reaching its maximum value.

Another counter (Transmit Wait Count("TWAITC") increments every time TARB 335 selects a word to transmit but is not able to send the word, especially due to lack of virtual lane credit. A rollover event is spawned when the counter increments after reaching its maximum value.

Another counter (Class 3 Toss Count ("C3TC") increments each time a SOFi3 or SOFn3 frame is tossed from TBUF 70A, except for hard zoning violations. A separate counter (Hard Zoning Violation Count ("HZVC") may be used for counting the number of attempts a frame makes to violate a hard zone at TBUF 70A. A rollover event is spawned when the counter increments after reaching its maximum value.

Yet another counter (Hard Zoning Toss Count ("HZTC")) may be used to count each time a SOFi3 or SOFn3 frame is tossed from TBUF for hard zoning violations resulting from ALUT 323 miss or multiple hits. A rollover event is spawned when the counter increments after reaching its maximum value.

In yet another aspect of the present invention, plural bit counters (Virtual Lane Credit Count)is used monitor virtual lane credit. The counter may be located among credit counters 328. The counters decrement each time a select R_RDY or VC_RDY is received and increments each time a frame is transmitted on a virtual lane. The following are some of the bits that may be used to monitor credits:

"TBUF_Frame_Departure: This bit sets each time a frame departs for a given virtual lane.

"HZ_Toss_Frame_Rollover" This denotes that a hard zoning toss count counter for a given virtual lane has overflowed and has gone back to zero.

"CL3_Toss_Frames_Rollover": This denotes that CL3TC counter for a given virtual lane has overflowed.

"CL2_Frames_Out Rollover": This denotes that the C2FO counter for a given virtual lane has overflowed.

"CL2_Words_Out_Rollover": This denotes that the C2WO counter for a given virtual lane has overflowed.

"CL3_Frames_Out_Rollover": This denotes that the C3FO counter for a given virtual lane has overflowed.

"CL3_Words_Out_Rollover": This denotes that the C3WO counter for a given virtual lane has overflowed.

"TwaitC0_Thres" Denotes that TWAITCO threshold for a given virtual lane has overflowed.

"Wait_Count0_Rollover": This denotes that the TWAITCO counter for a given virtual lane has overflowed.

"CL3_Toss_Error": This sets when a class fibre channel 3 frame is tossed out of TBUF 70A. This can occur because the frame timed out in RBUFF 69A or CBUF 62D, port is offline or logged out or TTAG 330 is in a flush state.

"CL2_Toss_Error"; This sets when a class 2 frame is tossed out of TBUF 70A.

The following describes various registers/counters that are used at TPORT 312A:

"Transmit Wait Count Register": This register increments each time a frame is available for transmission but cannot be transmitted due to lack of credit. This time interval may be the time needed to transmit, for example, one word (32 bits).

"Transmit Wait Count Rollover Event": This status event is set when the transmit wait count register rolls over from its maximum value to zero. This can be set to cause an interrupt to IOP 66.

"Transmit wait Count Threshold Register": This register contains a count that is compared to the transmit wait count threshold counter value. The register can be programmed by IOP 66.

"Transmit Wait Count Threshold Counter": This register increments each time a frame is ready to be transmitted but cannot due to lack of credit. It decrements each time the above condition is not true. If the counter is at its maximum value, then it does not increment. If the counter is at zero, then it does not decrement.

"Transmit Wait Count Threshold Event Status": This event occurs when the transmit wait count threshold counter value exceeds a threshold value programmed in the transmit wait count threshold register. This denotes that frames have been waiting to transmit based on a threshold value. The event can be used to trigger an interrupt to IOP 66.

The following describes various registers/counters that are used at RPORT 310A to prevent congestion:

"Receive Buffer Full Status": This status is set when all buffers (RBUF 69A) for a port are full. If the credit mechanism per fibre channel standards is operative then TPORT 312A cannot transmit because of lack of credit. This status can be programmed by firmware to cause an interrupt for IOP 66.

"Receive Buffer Full Threshold Register": This register maintains a count that is compared to "Receive Buffer Full threshold Counter" value.

"Receive Buffer Full Threshold Counter": This counter is incremented every time the receive buffers (69A) are full. The counters decrement when the buffer is not full. If the counter is at its maximum value, it stops incrementing. If the counter is at zero, it stops decrementing.

"Receive Buffer Full Threshold Event Status": This event happens if the receive buffer full threshold counter value exceeds the programmed (or hard coded) receive buffer full threshold register value. This will occur if received frames cannot be moved to their destination for a certain period. This event can be used to generate an interrupt for IOP 66.

The foregoing parameters as collected by modules 327 and 328 can be used by firmware for diagnostic purposes as well as for improving bandwidth.

Figures 1, 1E, 2:
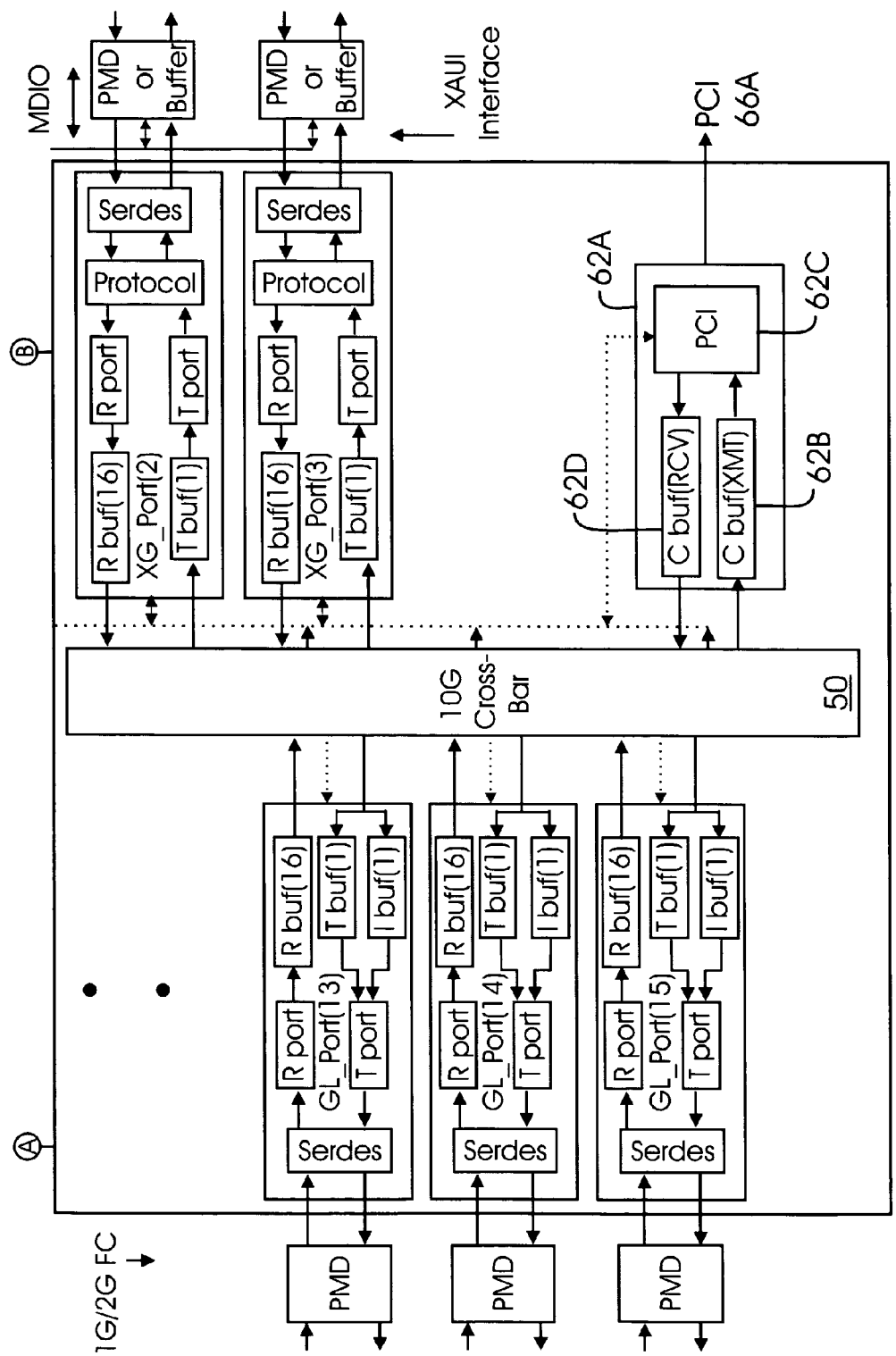
FIG. 2 shows a block diagram of plural hosts coupled to plural targets.
Figure 2:
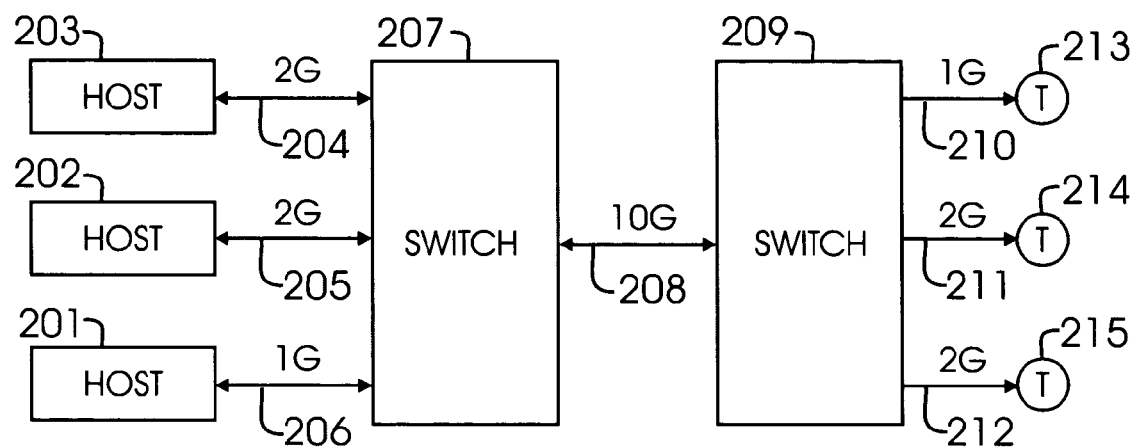

Pseudo-Virtual Lanes:

In one aspect of the present invention, pseudo virtual lanes ("PVL") are used to minimize congestion. The present invention allows the firmware to program a port for a PVL mode. The PVLs are used to allocate receive buffer credits located on the other end of an E_Port or N_Port. The credits are allocated in groups so that a device sending frames to a slow device does not consume all of the available receive credits and cause bandwidth degradation (as discussed above with respect to FIG. 2). The PVL can be used on E_Port, F_Ports or N_Ports that are connected to devices that may or may not support virtual lanes.

The present invention allows a virtual lane identifier for a PVL to be selected in plural ways and uses R_RDYs for virtual lane credit management, as described below. PVLs may also be programmable or may be assigned based on traffic congestion.

Figure 9A:
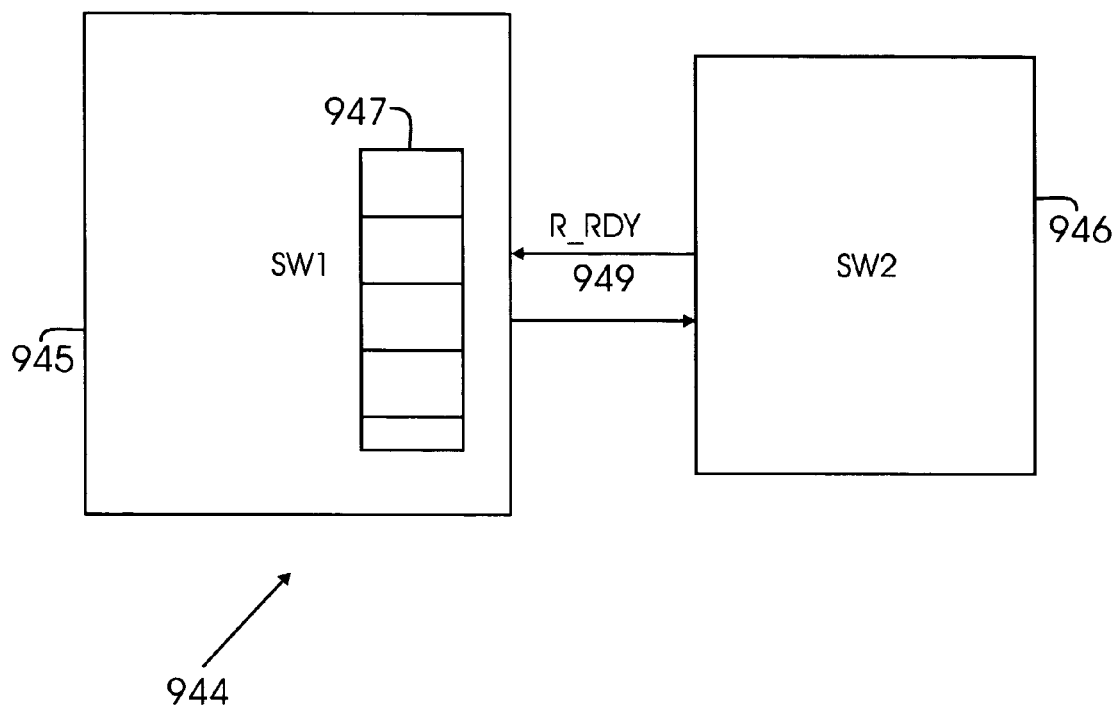
FIG. 9A shows a switch 945 that has pseudo virtual lane capability, according to one aspect of the present invention.

FIG. 9A shows a system 944 with switch 945 that has pseudo virtual lane capability (using pseudo virtual lanes 947) coupled to switch 946 that uses standard Buffer to Buffer credit mechanism and sends R_RDYs to switch 945. It is noteworthy that switches 945 and 946 are similar to the systems described above with respect to FIGS. 3 and 4.

Figure 9B:
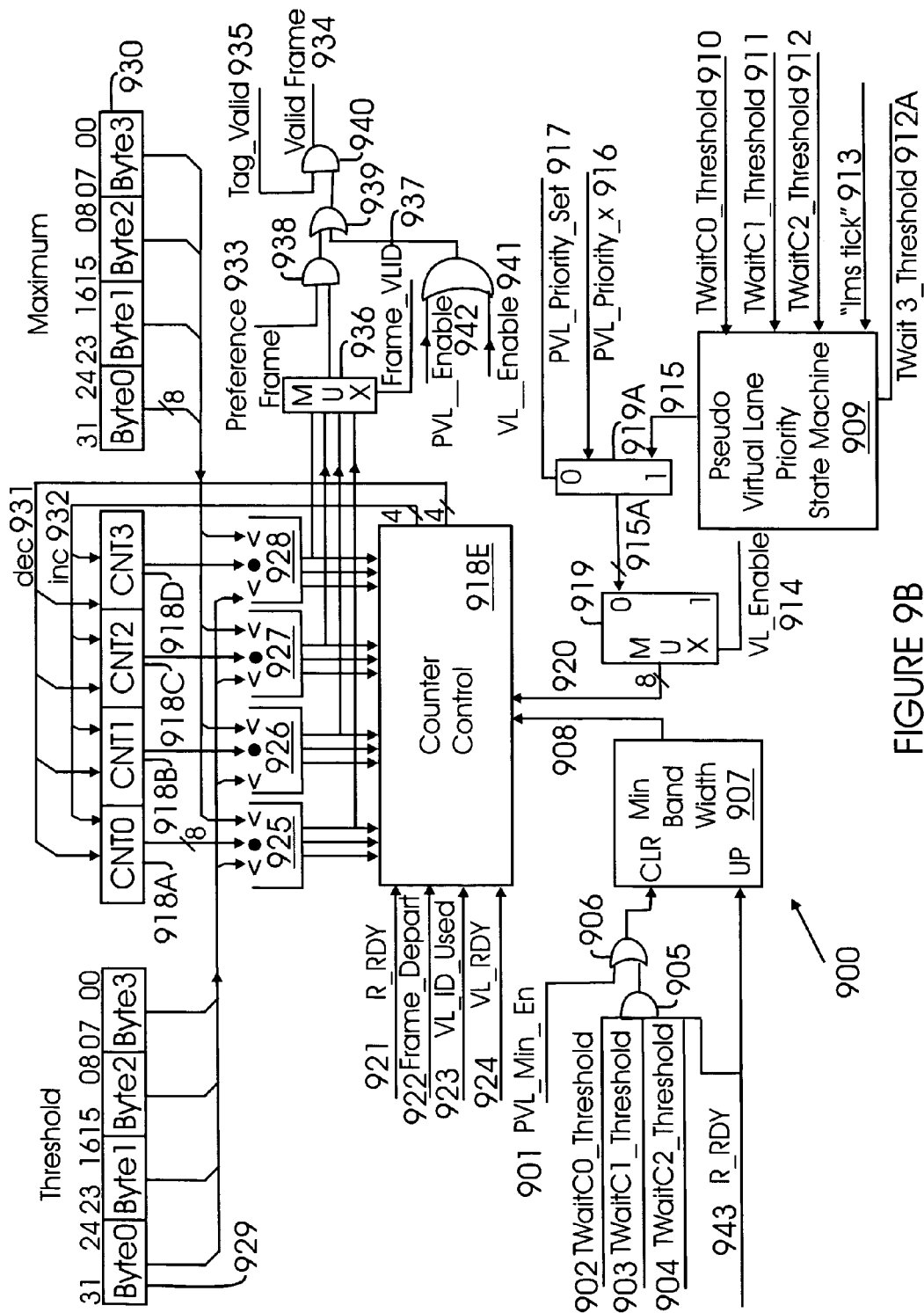
FIG. 9B shows a block diagram of a virtual lane credit counter, according to one aspect of the present invention.

FIG. 9B shows a block diagram of a virtual lane credit counter (VLCC) 900 located in module 328A (FIG. 4), according to one aspect of the present invention. When transmitting "connectionless frames" in a PVL mode, TPORT 312A transmits a frame only if there is credit at the remote link receiver for the selected lane.

TPORT 312A has plural PVL credit counters. FIG. 9B shows an example with four counters 918A-918D that increment when a frame is transmitted and decrement when a R_RDY is received from RPORT 311A. This count is compared against remote credit that is gained during switch login and contained in a register written by firmware. As long as there is no compare, and there is credit available at the destination, a frame can be transmitted. If there is no credit, then the transmission waits until more R_RDYs are received and allocated to that PVL.

PVLs are assigned based on a default transmission priority scheme, for example, lane 0 may have the highest priority and lane 3 may have the lowest priority. Firmware can change this priority scheme by writing into control register(s) 326 or by detecting traffic congestion on a particular lane.

Each PVL includes a programmable credit threshold value that allows each lane to consume more of the available credit at the expense of lower priority lanes. To protect lower priority lane access a minimum bandwidth mechanism (907) may be enabled by the firmware, as described below.

In one aspect of the present invention, each PVL has a programmable timer that monitors frame traffic. If a lane stops transmitting for a programmable time interval, a status bit is set and sent to the PVL state machine ("PVSM") 909. PVSM 909 monitors the status bit from the wait timers and adjusts the lane priority accordingly. If a lane with a higher transmit priority becomes congested then it has a ripple effect on lower priority lanes. PVSM 909 moves the higher priority congested lane to a lower transmission priority thus optimizing data throughput at TPORT 312A.

If the traffic congestion cannot be relieved, a minimum bandwidth mechanism may be enabled by firmware that forces bandwidth allocation to lower priority lanes. Asserting a signal to PVSM 909 after (n) R_RDYs have been detected provides the minimum bandwidth allocation.

Turning in detail to FIG. 9B, threshold registers 929 maintain threshold values for each PVL regarding how many buffer credits a particular PVL will be allocated before the allocation process is modified for the PVL. This value can be set by firmware.

VLCC 900 also maintains the maximum credit allocation for every PVL in module 930. This again can be set by the firmware. When switch 946 sends an R_RDY then Switch 945 has to choose which of the counters (918A-918D) to decrement. As a default, the lane with the highest priority gets the credit. If the highest priority lane has full credit, PVSM 909 distributes R_RDY to the next priority lane. This priority scheme ripples through all the PVLs.

In one aspect of the present invention, threshold values for module 929 are compared against each respective credit count. This credit comparison is used to distribute credit to lower priority PVLs. In the priority distribution process, a higher PVL consumes all credit (bandwidth) until its threshold level is reached. Once this occurs, credit is distributed between PVLs' based on a set of age bits that record which lane was the last lane to receive credit (i.e. the one that was the oldest lane).

If lane N threshold is reached, future credit is distributed between lane n and n+1. If lane n was the last lane to receive credit, then lane n is the oldest and lane n+1 is granted the next available credit (R_RDY).

In addition, if lane n and lane n+1 thresholds are reached, then credit is distributed between lane n, n+1 and n+2, based on the age bits described above. At any time, lane n may go below its threshold level and then lanes (n+x) (X=1, 2. . . k) will no longer be part of the credit distribution mechanism.

Counter control module 918E receives R_RDY 921, a Frame Depart signal 922, the actual VL_ID 923 for a lane, and VL_RDY 924.

Maximum credit values from module 930 are also compared to counter 918A-918D values. The comparison is performed by logic 925, 926, 927 and 928 The result of the comparison for a count less than the maximum is sent to counter control module 918E and Mux 936 that also receives the Frame_VL_ID value 937.

Output from mux 936 and a preference frame value 933 are sent to logic 938 (in this example, an OR gate). Output from logic 938 is then sent to logic 939 (in this example an OR gate), which also receives a PVL_Enable signal 942 or a VL_Enable signal 941 from control register 326. A tag valid signal 935 from TTAG 330 is received by logic 940 (in this example, an AND gate) and a Valid_Frame signal 934 is sent to TARB 331.

Mux 919A receives PVL priority signals 916 and 917. Signal 917 denotes if PVL priority is controlled by firmware and signal 916 denotes the lane number for a particular priority (where "x" represents various levels of priority, for example, A, B, C, D). Mux 919A also receives a signal 915 from PVSM 909 that sets PVL lane priority. Signal 915A is sent to Mux 919 that generates signal 920, which is sent to counter control module 918E. Signal 920 provides the priority order for each lane. Mux 919 also receives the VL_Enable signal 914 (similar to 941) to generate signal 920.

PVSM 909 monitors transmission wait count threshold values (TWAITCX) (also, status bits) 910, 911, 912 and 912A for each PVL. These wait count threshold signals are asserted when a lane cannot transmit data for a programmed amount of time. Based on the status bits and signal 913, PVSM 909 generates new PVL Priority signal(s) 915. Signal 913 is a timing signal that is sent at a pre-determined interval (for example, 1 millisecond).

Counter control module 918E increments (932) or decrements (signal 931) counters 918A-918D based on signals 920, counter comparison values from logic 925-928 and inputs 921-924.

To avoid the lowest priority lane from being given no credit, a minimum bandwidth circuit 907 is provided. Signal 908 is sent by minimum bandwidth logic 907. When circuit 907 is enabled (by signal 901 that is received through gate 906), it counts R_RDYs (943) and after a programmable number of R_RDYs are received, forces credit distribution based on age bits. Since the lowest priority lane will usually be the oldest, it will get a R_RDY (or credit). Using circuit 907 bypasses the priority distribution mechanism for distributing credit and distributes R_RDYs based on age bits. This guarantees a minimum bandwidth to all the lanes including the lowest priority lane.

Logic 907 is cleared and set by input received from gate 906. Gate 906 receives input from gate 905 and 901. gate 905 receives various threshold values (902-904 which are similar to 910-912).

Figure 10A:
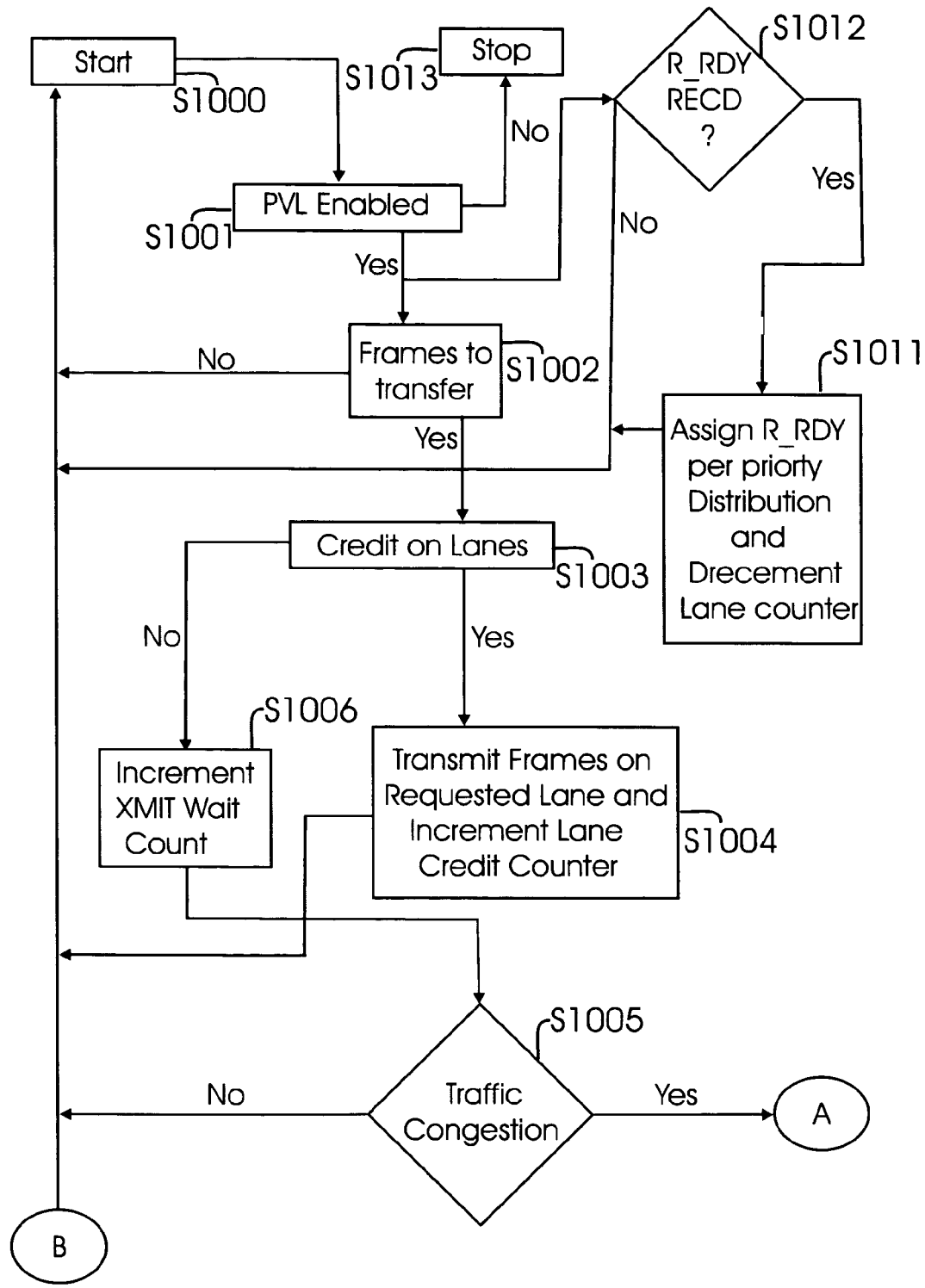
FIGS. 10A-10B show a flow diagram of executable process steps to assign a priority order to PVLs, according to one aspect of the present invention.
Figure 10B:
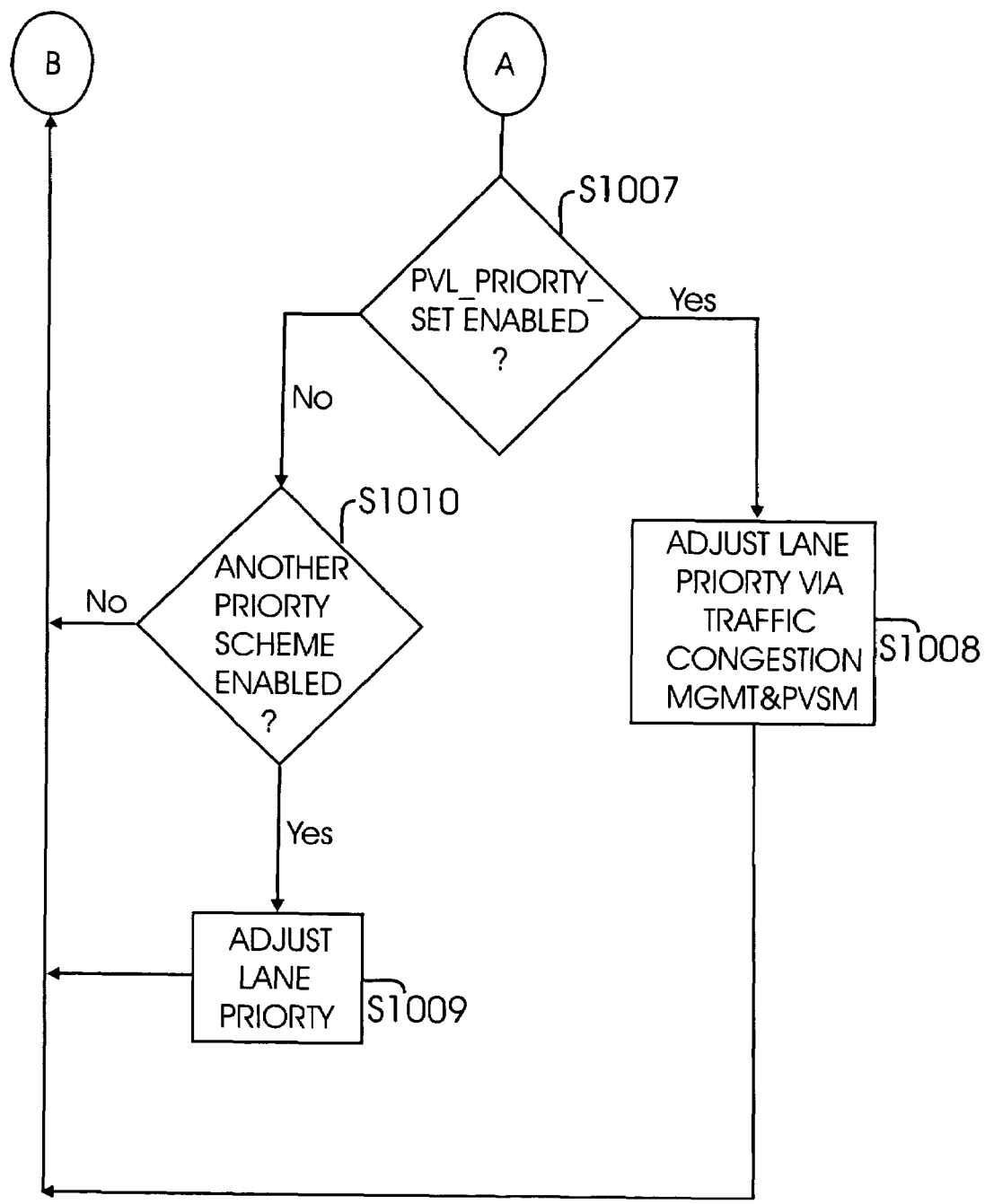

FIGS. 10A-10B show a flow diagram of executable process steps to assign a priority order to the PVLs, according to one aspect of the present invention. The process starts in step S1000. In step S1001, the process determines if PVL is enabled (based on signal 942, FIG. 9B). If PVL is not enabled, the process stops in step S1013.

If PVL is enabled, then in step S1012, the process determines if an R_RDY has been received. If an R_RDY has been received then in step S1011, R_RDY is assigned based on PVL priority distribution and lane count is decremented and the process moves to step S1000.

If an R_RDY is not received, the process moves to step S1000.

It is noteworthy that steps S1002 and S1012 occur in parallel.

In step S1002, the process determines if there are any frames to transfer. If there are no frames to transfer, the process moves back to step S1000.

If there are frames to transfer, in step S1003, the process determines if there is any credit on the lanes. If there is no credit, then the transmit wait count is increased in step S1006 and the process moves to step S1005.

If credit is available, then in step S1004, the frame is sent on the requested lane and the credit counter for the lane is incremented, and the process moves to step S1000.

In step S1005, the process determines if there is traffic congestion on one or more lanes. This can be determined by monitoring the transmit wait count thresholds for each lane. If there is no congestion, then the process reverts to step S1000.

If there is congestion, then in step S1007, the process determines if PVSM 909 controls the PVL priority set, and "PVL Priority" set is enabled. If it is, then the priority is adjusted to accommodate traffic congestion. PVSM 909 performs this function in step S1008, as described below with respect to FIG. 11 process flow diagram.

If the "PVL Priority Set" is not enabled, the process determines if there is another priority scheme in S1010. This could be based on software or firmware. If there is no priority scheme, then the process reverts to step S1000. If there is another priority scheme, then in step S1009, the lane priority is adjusted and the process reverts to step S1001.

Figure 11:
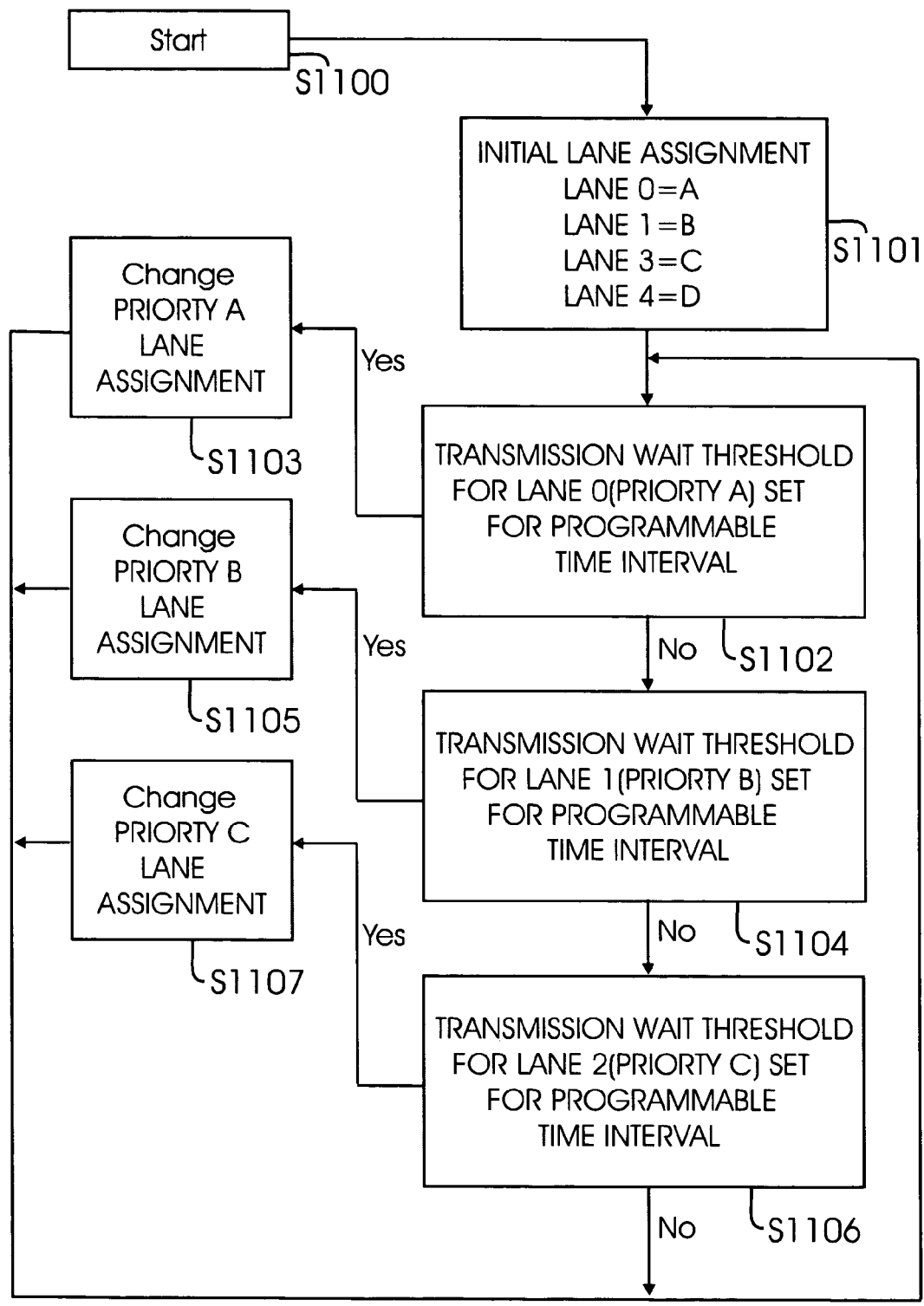
FIG. 11 shows a process flow diagram for adjusting lane priority, according to one aspect of the present invention.

FIG. 11 shows a process flow diagram for step S1008 (FIG. 10B) for adjusting lane priority. PVSM 909 performs the steps in FIG. 11. The FIG. 11 flow chart shows the adjustment for four lanes 0,1,2 and 3. This is merely to illustrate the adaptive aspects of the present invention, since the present invention is not limited to any particular number of PVLs.

Upon reset in step S1100, the initial lane assignments are set in step 1101 as Priority A=Lane 0, Priority B=Lane 1, Priority C=Lane 2 and Priority D=Lane 3. A has the highest priority, while D has the lowest priority.

PVSM 909 monitors PVL transmission wait count threshold signals (910-912A) for all the lanes.

In step S1102, the process determines if the transmission wait threshold for the lane assigned with priority A (in this example, lane 0) is set for a programmed time interval.

If the programmed interval is exceeded, then in step S1103, priority A lane assignment is changed. The priority re-assignment moves a congested lane to a lower priority thereby improving bandwidth in previously lower priority lanes. Priority assignment may be changed from A to B, A to C or A to D (i.e., lane 1=A and lane 0=B, lane 2=A, lane 0=C, or lane 0=D, lane 3=A).

If the transmission wait threshold for the lane with priority A is not set, then in step S1104, PVSM 909 determines if the threshold for the lane with priority B is set.

If the threshold is set for a programmed time interval, then in step S1105, PVSM 909 reassigns priority B lane assignment by exchanging B and C or B and D. Since the lane with priority A (lane 0) is not congested, that assignment remains the same.

If the threshold levels for both A and B are not set, then in step S1106, PVSM determines if the threshold level for the lane with priority C is set (for lane 2). If the threshold level is set, then in step S1107, the process changes priority C lane assignment. In this case, the lanes assigned to priority C and D exchange the priority level (i.e. lane 3 will get priority C, while lane 2 will be assigned priority D).

If the transmission wait count threshold level for the lane with priority A, B and C are not set for the programmable time interval, then the process moves back to step S1102. Also, the process loops back to step S1102 after steps S1103, S1105 or S1107.

In one aspect of the present invention, the redistribution of priority assignment among plural lanes prevents a ripple effect of higher priority congested lanes from congesting frame traffic on lower priority lanes by using too much buffer credit.

Although the present invention has been described with reference to specific embodiments, these embodiments are illustrative only and not limiting. Many other applications and embodiments of the present invention will be apparent in light of this disclosure and the following claims.

What is claimed is:

1. A method for assigning credit to a plurality of pseudo virtual lanes ("PVLs") for a fibre channel switch element, comprising:
    assigning an initial priority for each of the plurality of PVLs used by the fibre channel switch element;
    monitoring credit assigned to each of the plurality of PVLs to transmit frames;
    monitoring a transmission wait count for each of the plurality of PVLs, the transmit wait count indicating a time when a PVL is not able to transmit frames;
    adjusting the initial priority for the PVL if credit assigned to the PVL has reached a threshold value;
    adjusting the initial priority based on whether the transmission wait count for each of the plurality of PVLs has exceeded a threshold value providing an indicia for lane congestion;
    receiving a primitive (R RDY) from a receiving port indicating that the receiving port has space available to store a frame; and
    assigning the received R_RDY to a PVL from among the plurality of PVLs based on a PVL distribution scheme such that each PVL, regardless of PVL priority has access to a minimum bandwidth for transmitting and receiving Fibre Channel frames.

2. The method of claim 1, wherein the step of monitoring credit assigned to each of the plurality of PVLs to transmit frames comprises:
    maintaining a credit counter value for each PVL;
    decreasing the credit counter value when a PVL is assigned credit based on a received
    R RDY;
    determining if a PVL credit counter value has reached a threshold value; and
    assigning credit to a PVL with a priority lower than the priority of the PVL whose credit
    counter value has reached the threshold value.

3. The method of claim 1, wherein credit is assigned to a second PVL when a wait count value for a first PVL exceeds a threshold wait count value and the first PVL is determined to be congested.

4. The method of claim 3, wherein the threshold wait count value is a programmed value that is programmed by the fibre channel switch element firmware.

5. The method of claim 3, wherein a state machine for the fibre channel switch element monitors the threshold wait count value to determine congestion.

6. The method of claim 3, wherein to provide the minimum bandwidth to each PVL, a minimum bandwidth logic is enabled to assign credit to a PVL that has been waiting the longest to get credit.

7. The method of claim 6, wherein by enabling the minimum bandwidth logic, credit assignment based on PVL priority and traffic congestion is by passed and instead credit is assigned based on an age bit for each PVL, where the age bit indicates a duration for which the PVL has been waiting to receive credit.

8. The method of claim 1, wherein a PVL is used to allocate receive buffer credits at a fibre channel port and uses a primitive, R_RDY, for virtual lane credit management.

* * * * *

UNITED STATES PATENT AND TRADEMARK OFFICE
CERTIFICATE OF CORRECTION

PATENT NO. : 7,406,092 B2  Page 1 of 2
APPLICATION NO. : 10/894597
DATED : July 29, 2008
INVENTOR(S) : Frank R. Dropps It is certified that error appears in the above-identified patent and that said Letters Patent is hereby corrected as shown below:

On the Title Page:

On page 3, in column 2, under "Other Publications", line 3, delete "Trucking" and insert -- Trunking --, therefor.

In the Specifications:

In column 5, line 60, delete "F_Port FL_Port" and insert -- F_Port, FL_Port --, therefor.

In column 6, line 40, delete "(SERGES)" and insert -- (SERDES) --, therefor.

In column 6, line 41, delete "SERGES" and insert -- SERDES --, therefor.

In column 6, line 44, delete "convener" and insert -- converter --, therefor.

In column 13, line 13, delete "(M)in" and insert -- (M) in --, therefor.

In column 14, line 44, delete "("DEC"))increments" and insert -- ("DEC")) increments --, therefor.

In column 15, line 5, delete "Count)is" and insert -- Count) is --, therefor.

In column 19, line 14, delete "0,1,2" and insert -- 0, 1, 2 --, therefor.

In the Claims:

In column 20, line 18, in claim 1, delete "(R RDY)" and insert -- (R_RDY) --, therefor.

In column 20, line 32, in claim 2, delete delete "R RDY;" and insert -- R_RDY; --, on Col. 20, Line 31, after "recieved".

Signed and Sealed this

Twelfth Day of October, 2010

David J. Kappos
*Director of the United States Patent and Trademark Office*

In column 20, line 37, in claim 2, delete "counter value has reached the threshold value." and insert the same on line 36, after "credit".

In column 20, line 54, in claim 7, delete "by passed" and insert -- bypassed --, therefor.